United States Patent
Kang et al.

(10) Patent No.: US 11,663,936 B2
(45) Date of Patent: May 30, 2023

(54) ROBOT

(71) Applicant: LG ELECTRONICS INC., Seoul (KR)

(72) Inventors: Hoseong Kang, Seoul (KR); Iljae Lee, Seoul (KR); Sunghee Han, Seoul (KR); Seungjong Park, Seoul (KR); Jaeyoung Kim, Seoul (KR); Sunil Cho, Seoul (KR); Jaemyoung Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 516 days.

(21) Appl. No.: 16/845,699

(22) Filed: Apr. 10, 2020

(65) Prior Publication Data

US 2021/0166592 A1 Jun. 3, 2021

(30) Foreign Application Priority Data

Nov. 29, 2019 (KR) .................. 10-2019-0156971

(51) Int. Cl.
*G09F 21/04* (2006.01)
*G09F 7/20* (2006.01)
*B25J 5/00* (2006.01)
*G09F 7/18* (2006.01)

(52) U.S. Cl.
CPC .............. *G09F 21/04* (2013.01); *B25J 5/007* (2013.01); *G09F 7/20* (2013.01); *G09F 2007/1865* (2013.01)

(58) Field of Classification Search
CPC .... G09F 2007/1865; G09F 7/20; G09F 21/04; B25J 5/007; G10L 15/30
See application file for complete search history.

(56) References Cited

U.S. PATENT DOCUMENTS

| | | | | |
|---|---|---|---|---|
| 2,180,951 | A * | 11/1939 | Dale | G09F 19/08 40/407 |
| 5,636,462 | A * | 6/1997 | Kleiman | G09F 7/20 40/442 |
| 5,765,794 | A * | 6/1998 | Chen | F16M 11/10 248/292.12 |
| 7,936,564 | B1 * | 5/2011 | Brown | H05K 7/20972 40/591 |
| 9,330,582 | B1 * | 5/2016 | Spinner | G09F 11/23 |
| 10,538,190 | B1 * | 1/2020 | Metellus | B60F 5/02 |
| 2005/0034340 | A1 * | 2/2005 | Burke | G09F 21/04 40/591 |

(Continued)

*Primary Examiner* — David R Dunn
*Assistant Examiner* — Christopher E Veraa
(74) *Attorney, Agent, or Firm* — Birch, Stewart, Kolasch & Birch, LLP

(57) ABSTRACT

A robot includes a main body provided with a driving wheel, a neck body extending upward from a front portion of the main body, a head including a display body in which a display is provided, and a protrusion protruding from the display body and inserted into the neck body, a tilting mechanism for tilting the head, and a support frame disposed inside the neck body and supporting the tilting mechanism. The tilting mechanism includes a coupling body coupled to the protrusion, a supporter for supporting the coupling body and coupled to the support frame, and a motor for rotating the coupling body.

19 Claims, 21 Drawing Sheets

(56) References Cited

U.S. PATENT DOCUMENTS

| | | | | |
|---|---|---|---|---|
| 2007/0192910 | A1* | 8/2007 | Vu | B25J 19/06 |
| | | | | 901/17 |
| 2012/0105742 | A1* | 5/2012 | Davis | G09F 19/02 |
| | | | | 348/839 |
| 2012/0185096 | A1* | 7/2012 | Rosenstein | B25J 5/007 |
| | | | | 901/1 |
| 2014/0009561 | A1* | 1/2014 | Sutherland | B25J 9/08 |
| | | | | 348/14.05 |
| 2015/0190927 | A1* | 7/2015 | Sutherland | B25J 5/007 |
| | | | | 901/1 |
| 2016/0065920 | A1* | 3/2016 | Flessas | H04N 9/3147 |
| | | | | 348/383 |
| 2016/0161047 | A1* | 6/2016 | Kaytes | G09F 7/18 |
| | | | | 248/274.1 |
| 2018/0178375 | A1* | 6/2018 | Yang | B25J 19/00 |
| 2019/0005545 | A1* | 1/2019 | Roh | G06Q 30/0266 |
| 2019/0381673 | A1* | 12/2019 | Lee | B25J 11/008 |
| 2020/0009740 | A1* | 1/2020 | Youn | B25J 11/0005 |
| 2020/0023524 | A1* | 1/2020 | Mohamed | B62B 5/0089 |
| 2020/0164507 | A1* | 5/2020 | Murase | B25J 19/04 |
| 2020/0216129 | A1* | 7/2020 | Sutherland | A61L 2/26 |
| 2020/0219424 | A1* | 7/2020 | Duarte | G09F 27/00 |
| 2020/0406468 | A1* | 12/2020 | Stoianovici | G16H 20/70 |
| 2021/0001477 | A1* | 1/2021 | Jung | B25J 11/008 |
| 2021/0166592 | A1* | 6/2021 | Kang | G09F 7/20 |
| 2021/0170610 | A1* | 6/2021 | Kang | B25J 9/0009 |
| 2021/0221005 | A1* | 7/2021 | Thomaz | B25J 5/007 |
| 2021/0299868 | A1* | 9/2021 | Vitzrabin | B25J 9/161 |

* cited by examiner

ROBOT

CROSS-REFERENCE TO RELATED APPLICATIONS

The present application claims priority benefit of Korean Patent Application No. 10-2019-0156971 filed in the Republic of Korea on Nov. 29, 2019, which is hereby incorporated by reference in its entirety.

BACKGROUND

The present disclosure relates to a robot capable of autonomous driving.

In order to manage a part of factory automation, robots have been developed for industrial use. Recently, the application of robots has been further expanded. Not only medical robots and aerospace robots but also robots that can be used in daily life are being developed.

Such robots for daily life provide specific services (e.g., shopping, serving, talking, cleaning, etc.) in response to a user's command.

However, the existing robots for daily life are designed to provide only a specific service. Therefore, the utilization is not high as compared with the cost for the investment in developing robots.

Therefore, there is a need for a robot capable of providing various services.

SUMMARY

The present disclosure provides a robot in which a head is tilted smoothly with respect to a neck body.

The present disclosure also provides a robot capable of reducing a load of a head acting on a motor for tilting the head.

In one embodiment, a robot may include a main body provided with a driving wheel, a neck body extending upward from a front portion of the main body, a head including a display body in which a display is provided, and a protrusion protruding from the display body and inserted into the neck body, a tilting mechanism configured to tilt the head, and a support frame disposed inside the neck body and configured to support the tilting mechanism, wherein the tilting mechanism may include a coupling body coupled to the protrusion, a supporter configured to support the coupling body and coupled to the support frame, and a motor configured to rotate the coupling body.

The tilting mechanism may further include a bearing provided between the coupling body and the supporter.

Coupling holes, into which the coupling body is inserted, may be defined on both sides of the protrusion.

The coupling body may include an insertion portion inserted into the coupling holes, and an extension portion extending from an outer circumferential end of the insertion portion and contacting a side surface of the protrusion.

An engaging groove may be defined on an inner circumference of the coupling hole, and a projection that is caught by the engaging groove may be formed on an outer circumference of the coupling body.

In one embodiment, a robot may include a main body provided with a driving wheel, a neck body extending upward from a front portion of the main body, a head including a display body in which a display is provided, and a protrusion protruding from the display body and inserted into the neck body, a tilting mechanism configured to tilt the head, and a support frame disposed inside the neck body and configured to support the tilting mechanism, wherein the tilting mechanism may include a first coupling body and a second coupling body coupled to opposite sides of the protrusion, a motor configured to rotate the first coupling body, a first supporter configured to support the first coupling body and coupled to the support frame, and a second supporter configured to support the second coupling body and coupled to the support frame.

The tilting mechanism may include a first bearing provided between the first coupling body and the first supporter, and a second bearing provided between the second coupling body and the second supporter.

The first supporter may be provided with an opening hole through which a connector connecting the motor to the first coupling body passes.

The second supporter and the second coupling body may each be provided with a through hole through which a harness extending into the head passes.

The first supporter may be provided with an opening hole through which a connector connecting the motor to the first coupling body passes, the second supporter and the second coupling body may each be provided with a through hole through which a harness extending into the head passes, and a diameter of the through hole may be greater than a diameter of the opening hole.

A first coupling hole, to which the first coupling body is coupled, may be defined on one surface of the protrusion, a second coupling hole, to which the second coupling body is coupled, may be defined on the other surface of the protrusion, and a diameter of the second coupling hole may be greater than a diameter of the first coupling hole.

The tilting mechanism may be configured to tilt the head between a first slope at which the display faces a front side or a front upper side and a second slope at which the display faces a rear side or a rear upper side.

The tilting mechanism may be configured to tilt the head at the first slope when the main body travels, and tilt the head at the second slope when the main body is stopped.

An upper portion of the neck body may be bent toward a rear upper side

The neck body may include a neck housing including a rear case having an opened front side and a front cover covering the opened front side of the rear case, and a neck plate disposed vertically inside the neck housing and facing the front cover, the support frame being coupled to the neck plate.

The support frame may include a panel portion spaced forward from the neck plate, a pair of bent portions bent toward the neck plate at opposite edges of the panel portion, a first inclined portion extending in a rearwardly inclined direction toward an upper side from an upper end of the panel portion or the bent portion, the first supporter being coupled to the first inclined portion, and a second inclined portion spaced side by side with the first inclined portion, the second supporter being coupled to the second inclined portion.

A substrate connected to the head through a harness may be mounted on a front surface of the neck plate, and the harness may pass between the neck plate and the panel portion.

A through hole, through which the harness passes, may be defined in the panel portion.

In one embodiment, a robot may include a main body provided with a driving wheel, a neck body extending upward from a front portion of the main body, a head including a display body in which a display is provided on one surface thereof, and a protrusion protruding from the other surface of the display body and inserted into the neck body, a tilting mechanism disposed inside the neck body and connected to the protrusion to tilt the head, and a scanner provided on a circumferential surface of the display body and configured to scan a code, wherein the circumferential surface of the display body may include a first surface on which the scanner is provided and a second surface opposite to the first surface, and a distance between the protrusion and the first surface is closer than a distance between the protrusion and the second surface.

The tilting mechanism may be configured to tilt the head between a first slope at which the display faces a direction inclined toward a front upper side and a second slope at which the display faces a direction inclined toward a rear upper side, and when the head is at the first slope, the scanner may face the rear upper side, and when the head is at the second slope, the scanner may face a rear lower side.

The details of one or more embodiments are set forth in the accompanying drawings and the description below. Other features will be apparent from the description and drawings, and from the claims.

DETAILED DESCRIPTION OF THE EMBODIMENTS

Figure 1:
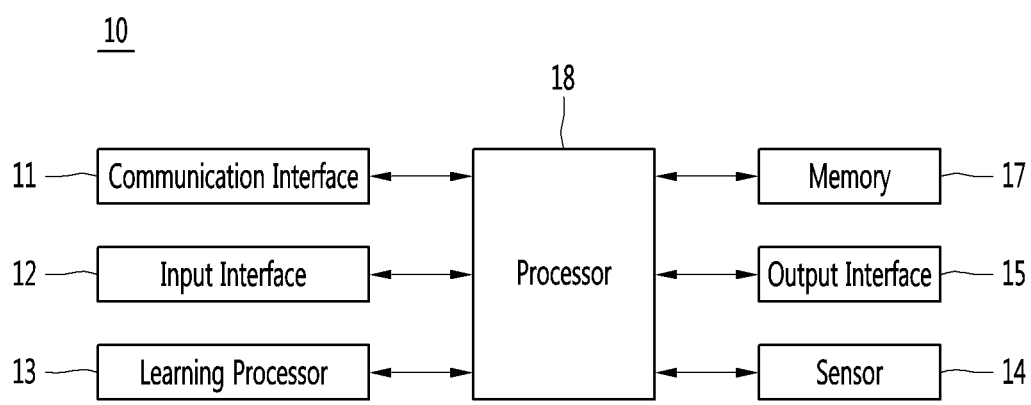
FIG. 1 illustrates an AI device including a robot according to an embodiment of the present disclosure.

Hereinafter, specific embodiments of the present disclosure will be described in detail with reference to the accompanying drawings.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driver including an actuator or a motor and may perform various physical operations such as moving a robot joint. In addition, a movable robot may include a wheel, a brake, a propeller, and the like in a driver, and may travel on the ground through the driver or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device 10 including a robot according to an embodiment of the present disclosure.

The AI device 10 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 10 may include a communication interface 11, an input interface 12, a learning processor 13, a sensor 14, an output interface 15, a memory 17, and a processor 18.

The communication interface 11 may transmit and receive data to and from external devices such as other AI devices 10a to 10e and the AI server 20 by using wire/wireless communication technology. For example, the communication interface 11 may transmit and receive sensor information, a user input, a learning model, and a control signal to and from external devices.

The communication technology used by the communication interface 11 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input interface 12 may acquire various kinds of data.

At this time, the input interface 12 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 12 may acquire a learning data for model learning and an input data to be used when an output is acquired by using learning model. The input interface 12 may acquire raw input data. In this case, the processor 18 or the learning processor 13 may extract an input feature by preprocessing the input data.

The learning processor 13 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 13 may perform AI processing together with the learning processor 24 of the AI server 20.

At this time, the learning processor 13 may include a memory integrated or implemented in the AI device 10. Alternatively, the learning processor 13 may be implemented by using the memory 17, an external memory directly connected to the AI device 10, or a memory held in an external device.

The sensor 14 may acquire at least one of internal information about the AI device 10, ambient environment information about the AI device 10, and user information by using various sensors.

Examples of the sensors included in the sensor 14 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 15 may generate an output related to a visual sense, an auditory sense, or a haptic sense.

At this time, the output interface 15 may include a display for outputting time information, a speaker for outputting auditory information, and a haptic module for outputting haptic information.

The memory 17 may store data that supports various functions of the AI device 10. For example, the memory 17 may store input data acquired by the input interface 12, learning data, a learning model, a learning history, and the like.

The processor 18 may determine at least one executable operation of the AI device 10 based on information determined or generated by using a data analysis algorithm or a machine learning algorithm. The processor 18 may control the components of the AI device 10 to execute the determined operation.

To this end, the processor 18 may request, search, receive, or utilize data of the learning processor 13 or the memory 17. The processor 18 may control the components of the AI device 10 to execute the predicted operation or the operation determined to be desirable among the at least one executable operation.

When the connection of an external device is required to perform the determined operation, the processor 18 may generate a control signal for controlling the external device and may transmit the generated control signal to the external device.

The processor 18 may acquire intention information for the user input and may determine the user's requirements based on the acquired intention information.

The processor 18 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 13, may be learned by the learning processor 24 of the AI server 20, or may be learned by their distributed processing.

The processor 18 may collect history information including the operation contents of the AI device 100 or the user's feedback on the operation and may store the collected history information in the memory 17 or the learning processor 13 or transmit the collected history information to the external device such as the AI server 20. The collected history information may be used to update the learning model.

The processor 18 may control at least part of the components of AI device 10 so as to drive an application program stored in memory 17. Furthermore, the processor 18 may operate two or more of the components included in the AI device 10 in combination so as to drive the application program.

Figure 2:
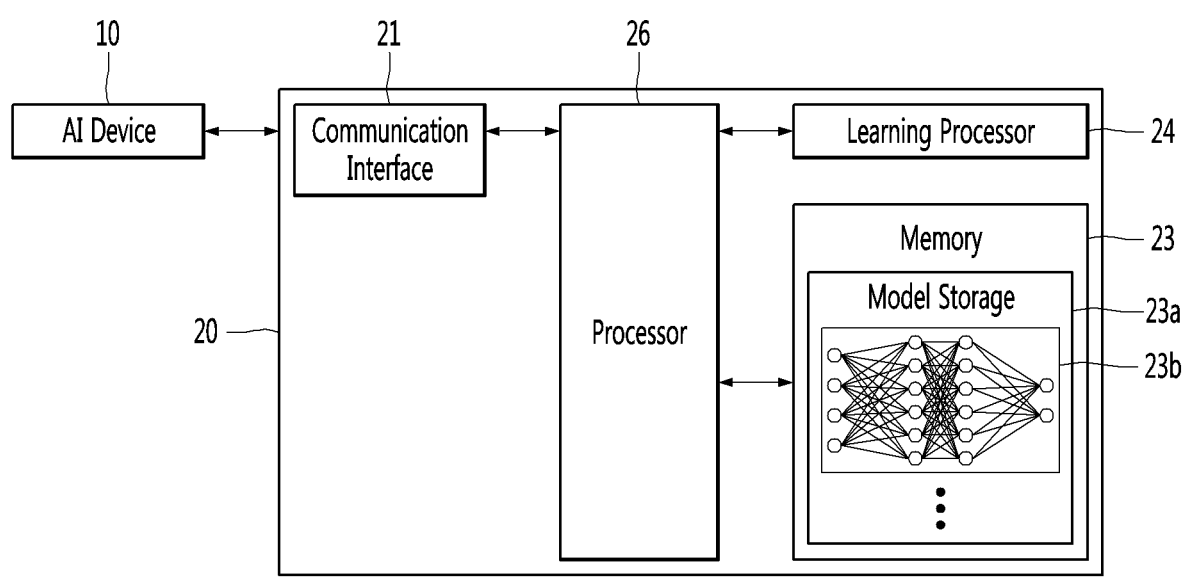
FIG. 2 illustrates an AI server connected to a robot according to an embodiment of the present disclosure.

FIG. 2 illustrates an AI server 20 connected to a robot according to an embodiment of the present disclosure.

Referring to FIG. 2, the AI server 20 may refer to a device that learns an artificial neural network by using a machine learning algorithm or uses a learned artificial neural network. The AI server 20 may include a plurality of servers to perform distributed processing, or may be defined as a 5G network. At this time, the AI server 20 may be included as a partial configuration of the AI device 10, and may perform at least part of the AI processing together.

The AI server 20 may include a communication interface 21, a memory 23, a learning processor 24, a processor 26, and the like.

The communication interface 21 can transmit and receive data to and from an external device such as the AI device 10.

The memory 23 may include a model storage 23*a*. The model storage 23*a* may store a learning or learned model (or an artificial neural network 23*b*) through the learning processor 24.

The learning processor 24 may learn the artificial neural network 23*b* by using the learning data. The learning model may be used in a state of being mounted on the AI server 20 of the artificial neural network, or may be used in a state of being mounted on an external device such as the AI device 10.

The learning model may be implemented in hardware, software, or a combination of hardware and software. If all or part of the learning models are implemented in software, one or more instructions that constitute the learning model may be stored in memory 23.

The processor 26 may infer the result value for new input data by using the learning model and may generate a response or a control command based on the inferred result value.

Figure 3:
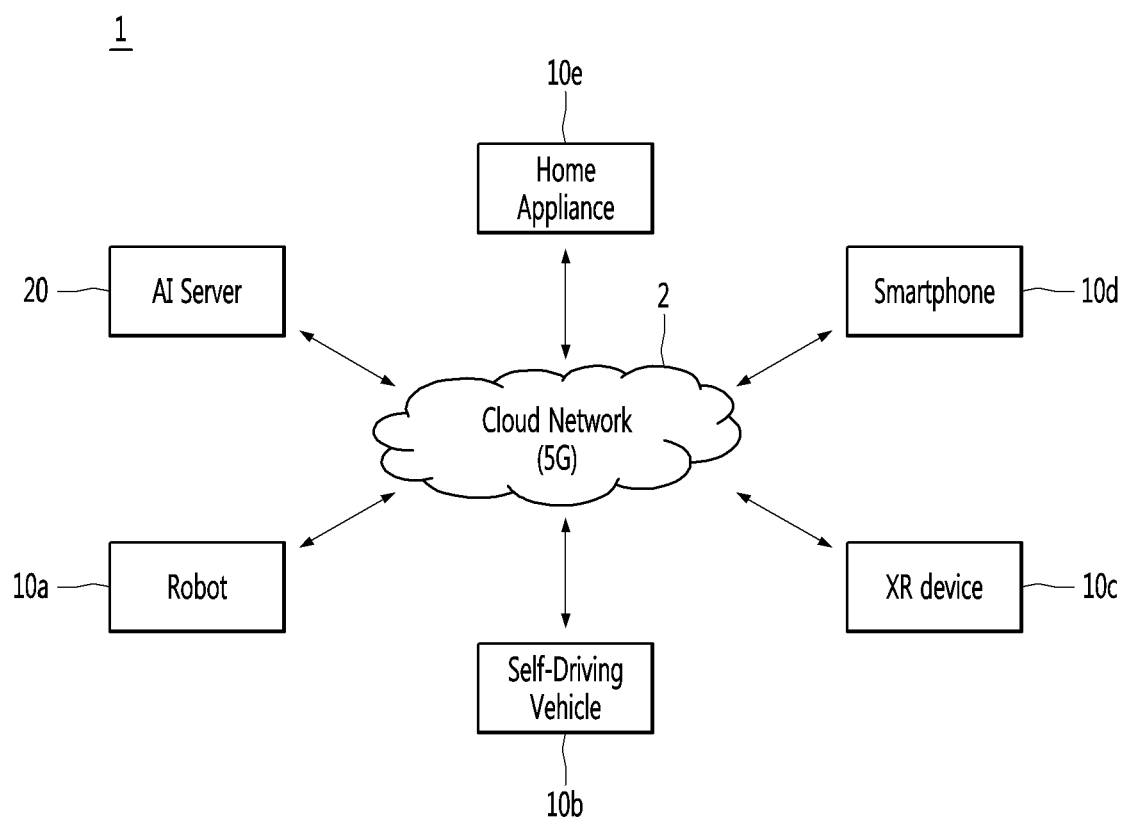
FIG. 3 illustrates an AI system according to an embodiment of the present disclosure.

FIG. 3 illustrates an AI system 1 according to an embodiment of the present disclosure.

Referring to FIG. 3, in the AI system 1, at least one of an AI server 20, a robot 10*a*, a self-driving vehicle 10*b*, an XR device 10*c*, a smartphone 10*d*, or a home appliance 10*e* is connected to a cloud network 2. The robot 10*a*, the self-driving vehicle 10*b*, the XR device 10*c*, the smartphone 10*d*, or the home appliance 10*e*, to which the AI technology is applied, may be referred to as AI devices 10*a* to 10*e*.

The cloud network 2 may refer to a network that forms part of a cloud computing infrastructure or exists in a cloud computing infrastructure. The cloud network 2 may be configured by using a 3G network, a 4G or LTE network, or a 5G network.

That is, the devices 10*a* to 10*e* and 20 configuring the AI system 1 may be connected to each other through the cloud network 2. In particular, each of the devices 10*a* to 10*e* and 20 may communicate with each other through a base station, but may directly communicate with each other without using a base station.

The AI server 20 may include a server that performs AI processing and a server that performs operations on big data.

The AI server 20 may be connected to at least one of the AI devices constituting the AI system 1, that is, the robot 10*a*, the self-driving vehicle 10*b*, the XR device 10*c*, the smartphone 10*d*, or the home appliance 10*e* through the cloud network 2, and may assist at least part of AI processing of the connected AI devices 10*a* to 10*e*.

At this time, the AI server 20 may learn the artificial neural network according to the machine learning algorithm instead of the AI devices 10*a* to 10*e*, and may directly store the learning model or transmit the learning model to the AI devices 10*a* to 10*e*.

At this time, the AI server 20 may receive input data from the AI devices 10*a* to 10*e*, may infer the result value for the received input data by using the learning model, may generate a response or a control command based on the inferred result value, and may transmit the response or the control command to the AI devices 10*a* to 10*e*.

Alternatively, the AI devices 10*a* to 10*e* may infer the result value for the input data by directly using the learning model, and may generate the response or the control command based on the inference result.

Hereinafter, various embodiments of the AI devices 10*a* to 10*e* to which the above-described technology is applied will be described. The AI devices 10*a* to 10*e* illustrated in FIG. 3 may be regarded as a specific embodiment of the AI device 10 illustrated in FIG. 1.

<AI+Robot>

The robot 10*a*, to which the AI technology is applied, may be implemented as a guide robot, a carrying robot, a cleaning robot, a wearable robot, an entertainment robot, a pet robot, an unmanned flying robot, or the like.

The robot 10*a* may include a robot control module for controlling the operation, and the robot control module may refer to a software module or a chip implementing the software module by hardware.

The robot 10*a* may acquire state information about the robot 10*a* by using sensor information acquired from various kinds of sensors, may detect (recognize) surrounding environment and objects, may generate map data, may determine the route and the travel plan, may determine the response to user interaction, or may determine the operation.

The robot 10*a* may use the sensor information acquired from at least one sensor among the lidar, the radar, and the camera so as to determine the travel route and the travel plan.

The robot 10*a* may perform the above-described operations by using the learning model composed of at least one artificial neural network. For example, the robot 10*a* may recognize the surrounding environment and the objects by using the learning model, and may determine the operation by using the recognized surrounding information or object information. The learning model may be learned directly from the robot 10a or may be learned from an external device such as the AI server 20.

At this time, the robot 10a may perform the operation by generating the result by directly using the learning model, but the sensor information may be transmitted to the external device such as the AI server 20 and the generated result may be received to perform the operation.

The robot 10a may use at least one of the map data, the object information detected from the sensor information, or the object information acquired from the external device to determine the travel route and the travel plan, and may control the driver such that the robot 10a travels along the determined travel route and travel plan.

The map data may include object identification information about various objects arranged in the space in which the robot 10a moves. For example, the map data may include object identification information about fixed objects such as walls and doors and movable objects such as chairs and desks. The object identification information may include a name, a type, a distance, and a position.

In addition, the robot 10a may perform the operation or travel by controlling the driver based on the control/interaction of the user. At this time, the robot 10a may acquire the intention information of the interaction due to the user's operation or speech utterance, and may determine the response based on the acquired intention information, and may perform the operation.

<AI+Robot+Self-Driving>

The robot 10a, to which the AI technology and the self-driving technology are applied, may be implemented as a guide robot, a carrying robot, a cleaning robot, a wearable robot, an entertainment robot, a pet robot, an unmanned flying robot, or the like.

The robot 10a, to which the AI technology and the self-driving technology are applied, may refer to the robot itself having the self-driving function or the robot 10a interacting with the self-driving vehicle 10b.

The robot 10a having the self-driving function may collectively refer to a device that moves for itself along the given movement line without the user's control or moves for itself by determining the movement line by itself.

The robot 10a and the self-driving vehicle 10b having the self-driving function may use a common sensing method so as to determine at least one of the travel route or the travel plan. For example, the robot 10a and the self-driving vehicle 10b having the self-driving function may determine at least one of the travel route or the travel plan by using the information sensed through the lidar, the radar, and the camera.

The robot 10a that interacts with the self-driving vehicle 10b exists separately from the self-driving vehicle 10b and may perform operations interworking with the self-driving function of the self-driving vehicle 10b or interworking with the user who rides on the self-driving vehicle 10b.

At this time, the robot 10a interacting with the self-driving vehicle 10b may control or assist the self-driving function of the self-driving vehicle 10b by acquiring sensor information on behalf of the self-driving vehicle 10b and providing the sensor information to the self-driving vehicle 10b, or by acquiring sensor information, generating environment information or object information, and providing the information to the self-driving vehicle 10b.

Alternatively, the robot 10a interacting with the self-driving vehicle 10b may monitor the user boarding the self-driving vehicle 10b, or may control the function of the self-driving vehicle 10b through the interaction with the user. For example, when it is determined that the driver is in a drowsy state, the robot 10a may activate the self-driving function of the self-driving vehicle 10b or assist the control of the driver of the self-driving vehicle 10b. The function of the self-driving vehicle 10b controlled by the robot 10a may include not only the self-driving function but also the function provided by the navigation system or the audio system provided in the self-driving vehicle 10b.

Alternatively, the robot 10a that interacts with the self-driving vehicle 10b may provide information or assist the function to the self-driving vehicle 10b outside the self-driving vehicle 10b. For example, the robot 10a may provide traffic information including signal information and the like, such as a smart signal, to the self-driving vehicle 10b, and automatically connect an electric charger to a charging port by interacting with the self-driving vehicle 10b like an automatic electric charger of an electric vehicle.

Figure 4:
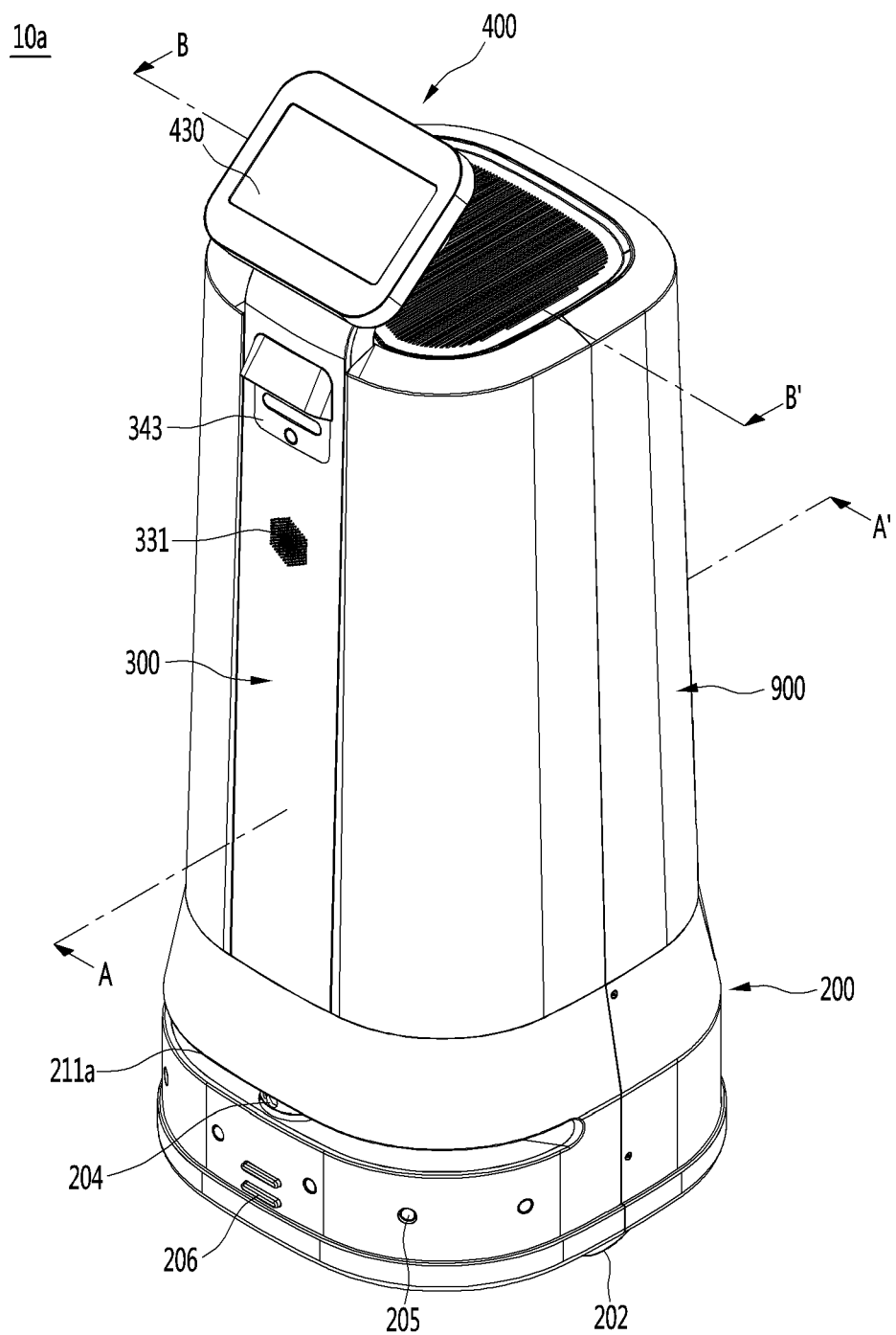
FIG. 4 is a perspective view of a robot according to an embodiment of the present disclosure.
Figure 5:
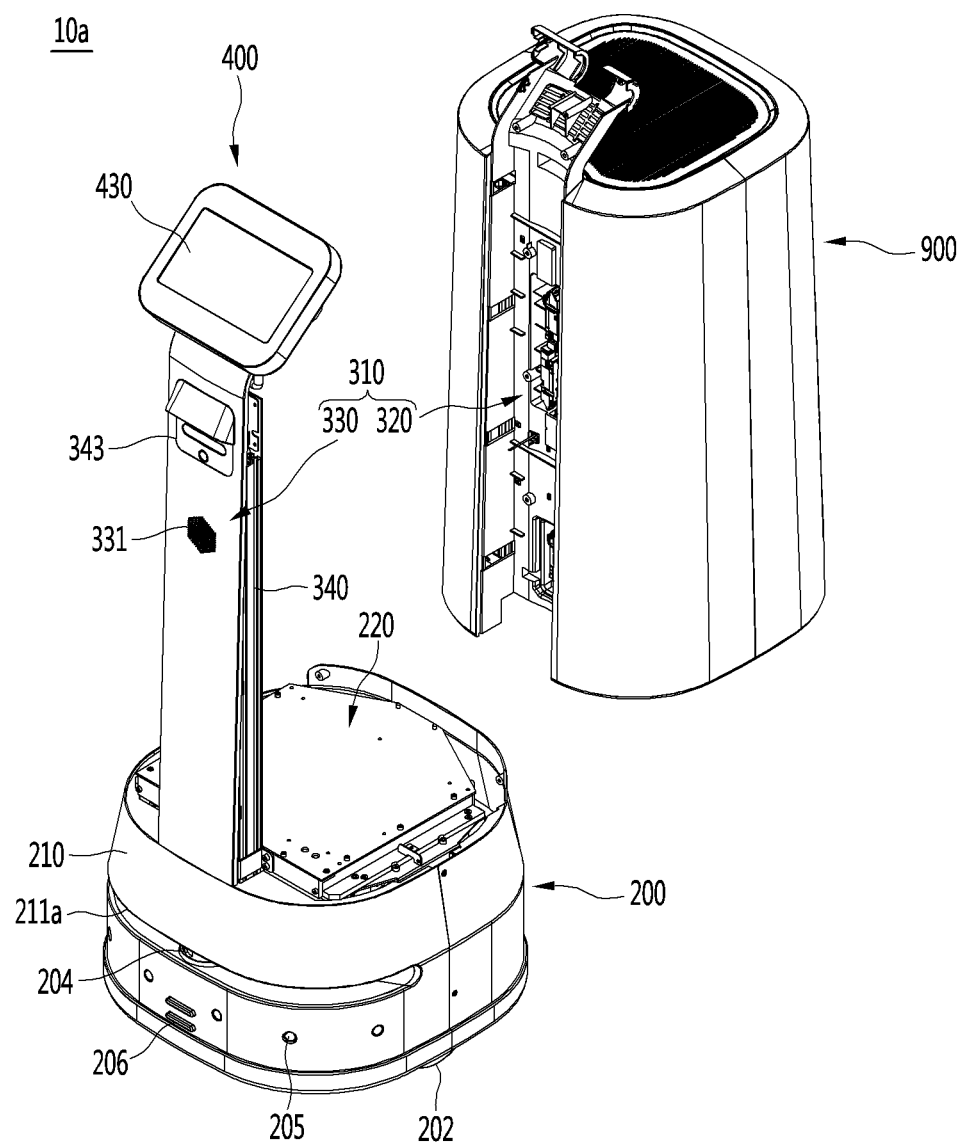
FIG. 5 is a view illustrating a service module separated from the robot illustrated in FIG. 4.
Figure 6:
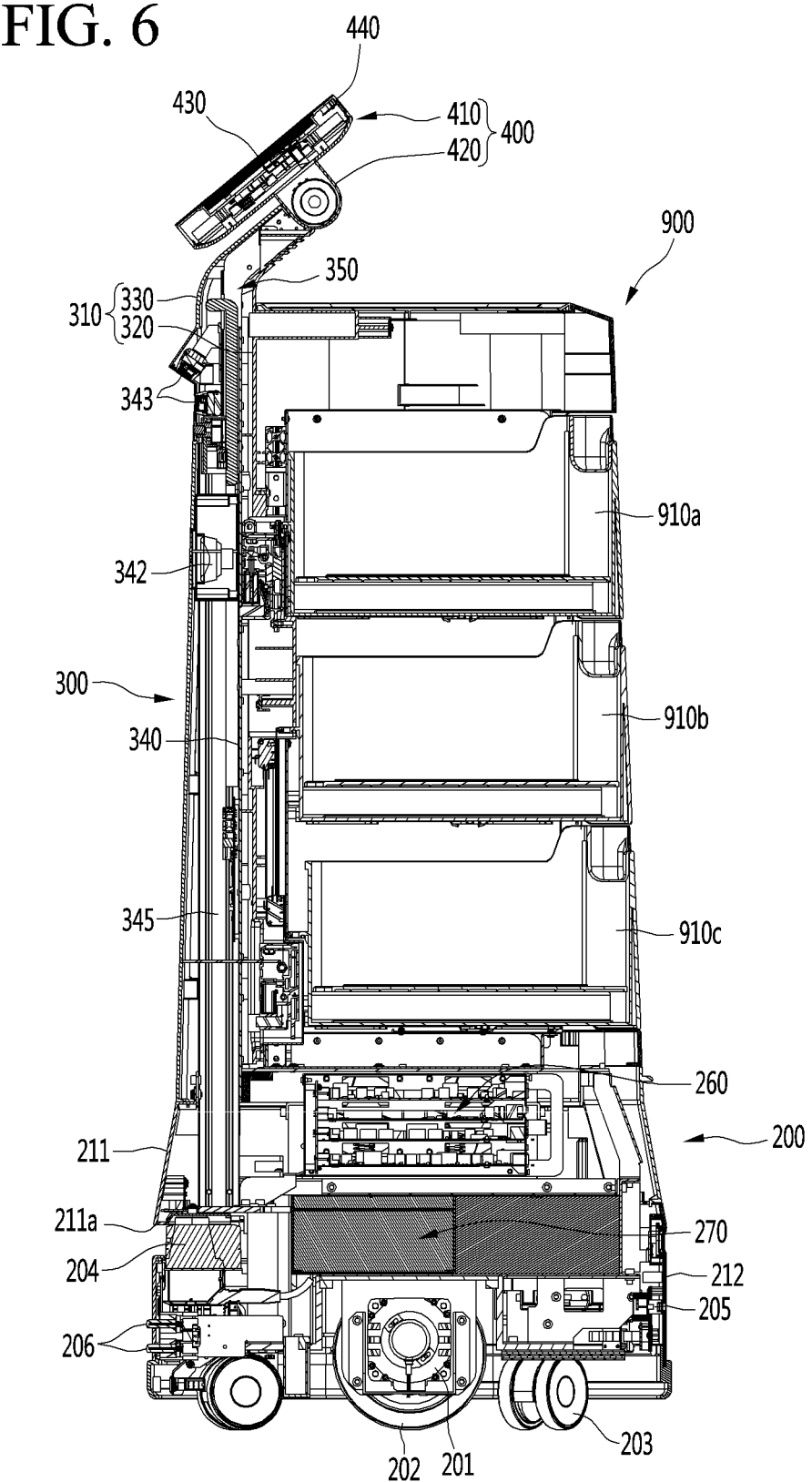
FIG. 6 is a cross-sectional view taken along line A-A' of FIG. 4.

FIG. 4 is a perspective view of a robot according to an embodiment of the present disclosure, FIG. 5 is a view illustrating a service module separated from the robot illustrated in FIG. 4, and FIG. 6 is a cross-sectional view taken along line A-A' of FIG. 4.

The robot 10a according to the present embodiment may include a main body 200, a neck body 300, and a head 400. The robot 10a may further include a service module 900.

The main body 200 may form a base of the robot 10a. The main body 200 may be provided with a driving wheel 202 that drives the robot 10a. The driving wheel 202 may protrude downward of the main body 200.

In addition, the main body 200 may be provided with a caster 203 (see FIG. 6). The caster 203 may protrude downward from the main body 200 and may assist the driving of the robot 10a.

The main body 200 may include a housing 210 and a body frame 220.

The housing 210 may form the appearance of the main body 200. The housing 210 may form the circumferential surface of the main body 200. The housing 210 may surround the circumference of the body frame 220. That is, the body frame 220 may be disposed inside the housing 210.

The upper surface of the housing 210 may be opened, and the service module 900 to be described below may cover the opened upper surface of the housing 210 from above. The service module 900 may cover the body frame 220 from above. However, the present disclosure is not limited thereto, and the upper surface of the housing 210 may support the service module 900.

The housing 210 may include a front housing 211 and a rear housing 212. Therefore, the work of coupling and separating the housing 210 may be facilitated.

The front housing 211 may be convexly curved forward, and the rear housing 212 may be convexly curved backward. The rear end of the front housing 211 and the front end of the rear housing 212 may be in contact with each other. The outer surface of the front housing 211 and the outer surface of the rear housing 212 may be continuously connected.

A lidar 204 may be provided in the main body 200. In more detail, the housing 210 may be provided with a recessed portion 211a in which the lidar 204 is disposed. The recessed portion 211a may be recessed rearward from the front surface of the housing 210, more specifically, the front housing 211. The recessed portion 211a is opened toward the front portion and may be formed long in the left-and-right direction (e.g., horizontal direction). The lidar 204 may detect an obstacle or a person located in front of the robot 10a through the recessed portion 211a.

The main body 200 may be provided with a plurality of ultrasonic sensors 205. The plurality of ultrasonic sensors 205 may be spaced apart from each other in the circumferential direction of the main body 200. In more detail, a plurality of openings in which the ultrasonic sensors 205 are disposed may be defined on the outer circumference of the housing 210. Each of the ultrasonic sensors 205 may detect an object around the robot 10a through the opening.

The ultrasonic sensor 205 may be provided at a lower position than the lidar 204. In more detail, the height of the ultrasonic sensor 205 may be lower than the height of the lidar 204 with respect to the lower end of the main body 200.

The main body 200 may be provided with a terminal 206 configured to charge the robot 10a. A through hole through which the terminal 206 passes may be defined in the housing 210, more specifically, the front housing 211. The terminal 206 may protrude forward from the housing 210 through the through hole.

The robot 10a may dock the terminal 206 to a charger, and the charger may charge a battery 270 embedded in the robot 10a through the terminal 206. The charger may be provided in a wall or a structure of a room where the robot 10a travels.

The terminal 206 may be provided at a lower position than the ultrasonic sensor 205. In more detail, the height of the terminal 206 may be lower than the height of the ultrasonic sensor 205 with respect to the lower end of the main body 200.

A control rack 260 and a battery 270 may be embedded in the main body 200. In more detail, the control rack 260 and the battery 270 may be positioned inside the housing 210 and mounted to the body frame 220.

The control rack 260 may include a plurality of substrates for the operation of the robot 10a. For example, the control rack 260 may include a main control board configured to control the overall operation of the robot 10a and a power board electrically connected to the battery 270. The main control board may include at least one processor 18 (see FIG. 1).

The battery 270 may supply power necessary for the operation of the robot 10a. The battery 270 may be electrically connected to the terminal 206, and charging of the battery 270 may be performed through the terminal 206.

The battery 270 may be positioned below the control rack 260. That is, since the relatively heavy battery 270 is positioned below the main body 200, the center of gravity of the main body 200 can be lowered and the robot can travel stably.

The main body 200 may be provided with a driving motor 201 configured to rotate the driving wheel 202. The driving motor 201 may be provided below the body frame 220. The driving motor 201 may be positioned below the battery 270. The driving motor 201 may be positioned inside the housing 210.

The neck body 300 may extend upward from the front portion of the main body 200. The neck body 300 may be formed vertically. The neck body 300 may protrude upward as compared with the service module 900. The upper portion of the neck body 300 may be bent toward the rear upper side.

The neck body 300 may include a neck housing 310 and a neck plate 340 disposed inside the neck housing 310. The neck body 300 may further include a neck frame 345.

The neck housing 310 may form the appearance of the neck body 300. The neck housing 310 may have an inner space in which the neck plate 340 is disposed.

The neck housing 310 may include a rear case 320 having an opened front portion and a front cover 330 configured to cover the opened front portion of the rear case 320. The rear case 320 may be coupled to the service module 900.

The neck plate 340 may be positioned between the rear case 320 and the front cover 330. The neck plate 340 may function as a mounter to which various electrical components embedded in the neck housing 310 are mounted.

The front surface of the neck plate 340 may face the rear surface of the front cover 330. The electrical components may be positioned between the neck plate 340 and the front cover 330. Therefore, the operator can easily maintain the electrical components by separating only the front cover 330. The neck plate 340 may be coupled to and supported by the neck frame 345.

The neck frame 345 may have a vertical bar shape. The neck frame 345 may extend vertically from the body 200 to the inside of the neck housing 310. That is, the lower end of the neck frame 345 may be coupled to the body frame 220.

The neck frame 345 may be provided with a pair spaced side by side. The neck plate 340 may be coupled to the rear surfaces of the pair of neck frames 345, and electrical components mounted on the front surface of the neck plate 340 may be positioned between the pair of neck frames 345.

A support frame 350 may be coupled to the upper portion of the neck frame 345. The support frame 350 can support a tilting mechanism 450 (see FIG. 8). In addition, the support frame 350 may support the load of the head 400.

The support frame 350 may be positioned inside the neck housing 310. The support frame 350 may be coupled to the front surface of the neck plate 340. In more detail, the support frame 350 may be coupled to the front surface of the upper end of the neck plate 340.

The support frame 350 may protrude upward as compared with the neck plate 340. A tilting mechanism configured to tilt the head 400 may be mounted to the support frame 350.

The neck body 300 may be provided with a speaker 342. In more detail, the speaker 342 may be mounted to the neck plate 340, and a sound hole 331 facing the speaker 342 may be defined in the front cover 330. A sound generated from the speaker 342 may be transmitted to the outside of the robot 10a through the sound hole 331.

The neck body 300 may be provided with a camera 343. The camera 343 may be a depth camera. The camera 343 may be disposed above the speaker 342. The camera 343 may be mounted to the neck plate 340 and/or the support frame 350 to be described below, and an opening hole in which the camera 343 is disposed may be defined in the front cover 330.

The head 400 may be connected to the upper end of the neck body 300. The head 400 may be tilted back and forth with respect to the neck body 300. The head 400 may be positioned above the service module 900.

The head 400 may include a display body 410 in which a display 430 is provided, and a protrusion 420 protruding from the display body 410.

The display 430 may be provided on one surface of the display body 410. A preset image or video may be output on the display 430. In addition, the display 430 may include a touch panel and function as an input interface capable of a touch input.

The protrusion 420 may protrude from the other surface of the display body 410. The protrusion 420 may be connected to the upper end of the neck body 300.

The head 400 may be provided with a scanner 440. In more detail, the scanner 440 may be provided on the circumferential surface of the display body 410.

The scanner 440 may include an optical sensor configured to scan a preset code. In one example, scanner 440 may be configured to scan a barcode and/or a QR code. A user may tag the barcode and/or the QR code to the scanner 440 to confirm that the user is an authenticated user and use the robot 10a.

The service module 900 may cover the main body 200 from above. In addition, the service module 900 may cover the neck body 300 from the rear (i.e., from a rear view, the service module 900 may overlap the neck body 300).

The service module 900 may be positioned to be lower than the head 400. In more detail, the height from the upper end of the main body 200 to the head 400 may be greater than the height of the service module 900.

The service module 900 may be changed as necessary. In the present embodiment, a case in which the service module 900 includes a plurality of drawers 910a, 910b, and 910c will be described as an example.

The plurality of drawers 910a, 910b, and 910c may be positioned at different heights. Each of the drawers 910a, 910b, and 910c may slide back and forth (e.g., front-to-rear direction or longitudinal direction). In more detail, the drawers 910a, 910b, and 910c may be opened by sliding backward or may be closed by sliding forward. The robot 10a may autonomously travel in a state in which articles (e.g., objects) are accommodated in the plurality of drawers 910a, 910b, and 910c.

Figure 7:
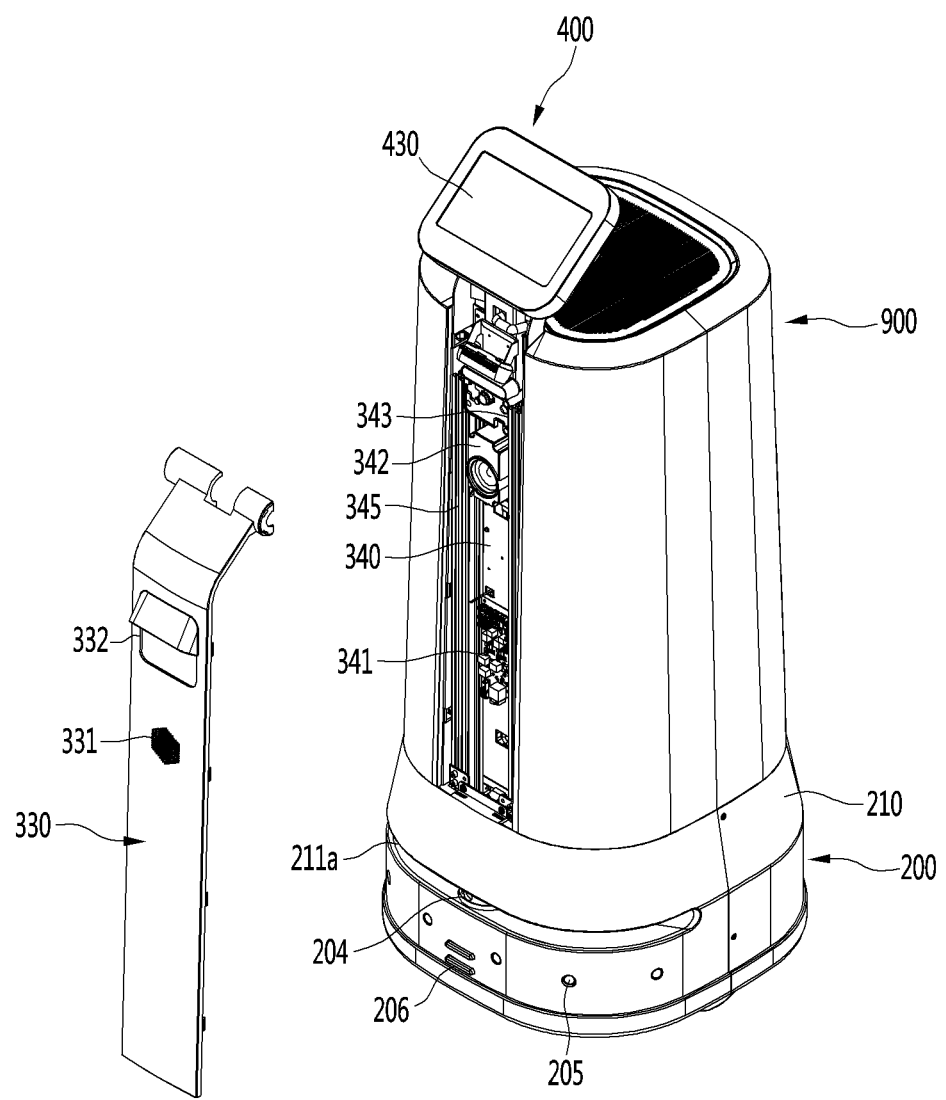
FIG. 7 is a view illustrating a front cover separated from the robot illustrated in FIG. 4.
Figure 8:
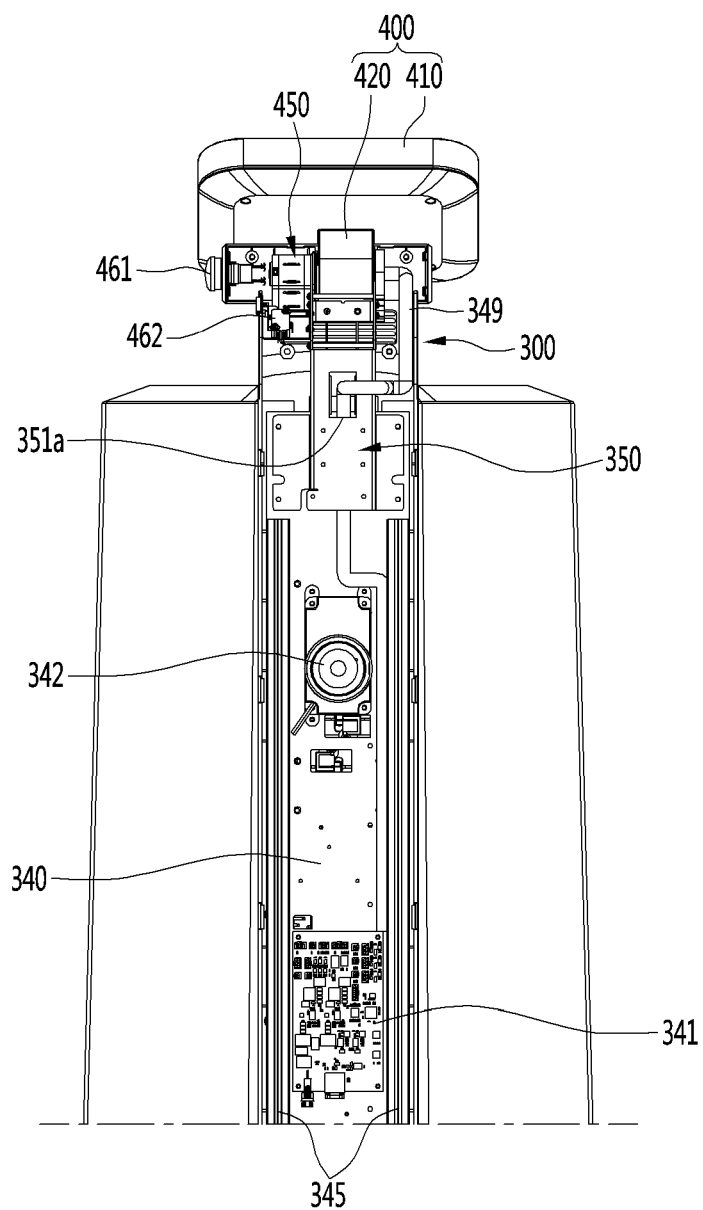
FIG. 8 is a view illustrating the inside of a neck body according to an embodiment of the present disclosure.

FIG. 7 is a view illustrating the front cover separated from the robot illustrated in FIG. 4, and FIG. 8 is a view illustrating the inside of the neck body according to an embodiment of the present disclosure.

For convenience of description, a state in which the camera 343 is removed and the head 400 is tilted backward is illustrated in FIG. 8.

The neck body 300 may be provided with a substrate 341. In more detail, the substrate 341 may be provided on the front surface of the neck plate 340 and may be positioned between the pair of neck frames 345. The substrate 341 may be positioned below the speaker 342.

The substrate 341 may be electrically connected to a head substrate 433 (see FIG. 11) embedded in the head 400 and a main control board included in the control rack 260 (see FIG. 6) of the main body 200.

Therefore, as compared with a case where the main control board and the head substrate 433 are connected to each other without the substrate 341, the length of a harness 349 is shortened and the robot 10a is more easily assembled (e.g., assembly of the robot 10a is improved).

The harness 349 may connect the substrate 341 to the head substrate 433. That is, the harness 349 may extend from the inside of the neck body 300 to the inside of the head 400.

A part of the support frame 350 may be spaced forward with respect to the neck plate 340 to define a gap through which the harness 349 passes. In addition, a through hole 351a through which the harness 349 passes may be formed in the support frame 350. Therefore, the harness 349 may sequentially pass through the gap and the through hole 351a and may enter the protrusion 420 of the head 400.

The through hole 351a of the support frame 350 may be positioned above the camera 343. Therefore, the harness 349 can extend without interfering with the camera 343.

Meanwhile, the robot 10a may further include a tilting mechanism 450 configured to tilt the head 400.

The tilting mechanism 450 may be embedded in the neck body 300. In more detail, the tilting mechanism 450 may be positioned inside the upper portion of the neck housing 310 and may be mounted to the support frame 350.

The protrusion 420 of the head 400 may be inserted into the neck body 300, and the tilting mechanism 450 may be connected to the protrusion 420 of the head 400. A detailed configuration of the tilting mechanism 450 will be described in detail below.

The neck body 300 may be provided with an emergency stop switch 461 and a release switch 462. The emergency stop switch 461 and the release switch 462 may be provided at the upper side surface of the neck body 300.

The emergency stop switch 461 can emergently stop the robot 10a that is traveling. In more detail, a brake, as known in the art, such as a disc brake, a drum brake, a caliper brake, a cantilever brake, or the like, may be connected to the driving motor 201 described above, and when the emergency stop switch 461 is pressed, the brake may be immediately operated to stop the rotation of the driving motor 201 and the driving wheel 202.

The release switch 462 may release the brake so as to enable the stopped robot 10a to be moved manually. In more detail, when the robot 10a is stopped, the brake may be kept operating so as to prevent the driving wheel 202 from being rotated by external force. In this case, when the release switch 462 is pressed, the brake is released and the driving wheel 202 may be rotated by external force. Therefore, the user can push and move the robot 10a while pressing the release switch 462.

Figure 9:
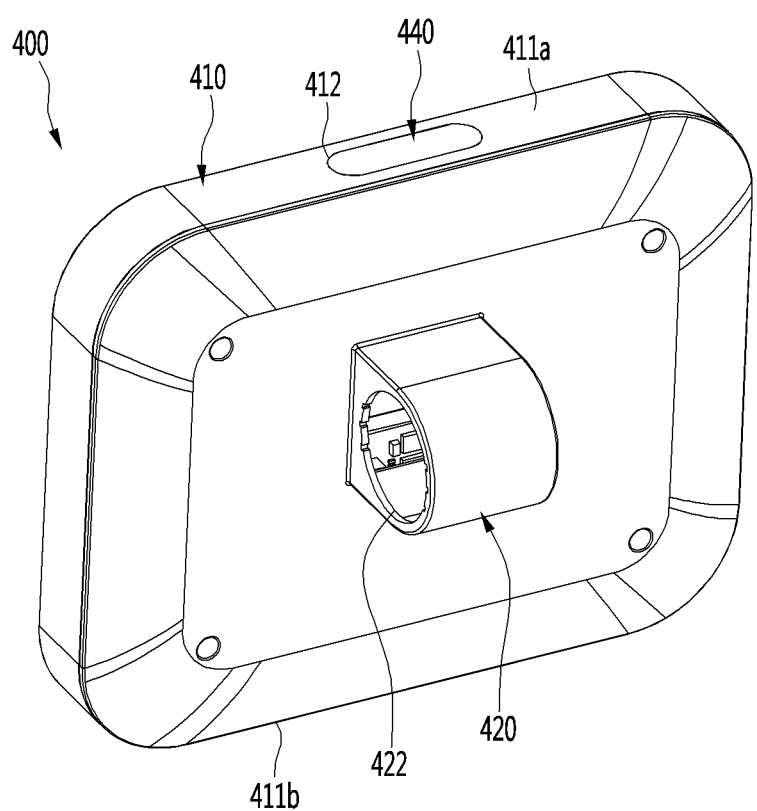
FIG. 9 is a view illustrating the appearance of a head according to an embodiment of the present disclosure.
Figure 10:
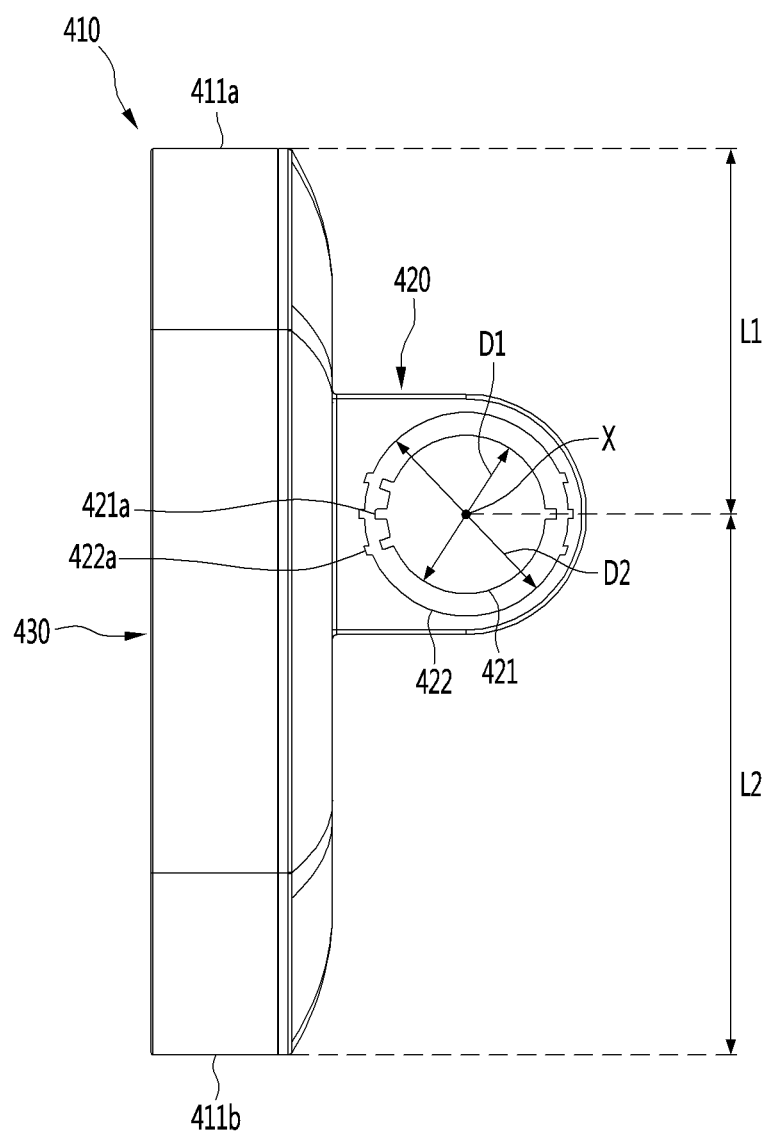
FIG. 10 is a side view of the head illustrated in FIG. 9.
Figure 11:
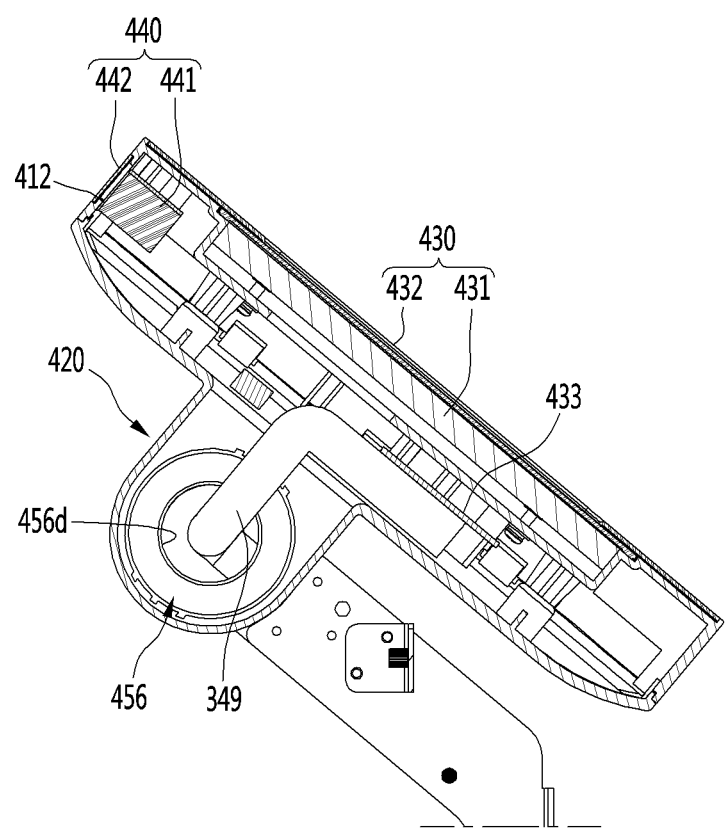
FIG. 11 is a view illustrating the inside of the head according to an embodiment of the present disclosure.

FIG. 9 is a view illustrating the appearance of the head according to an embodiment of the present disclosure, FIG. 10 is a side view of the head illustrated in FIG. 9, and FIG. 11 is a view illustrating the inside of the head according to an embodiment of the present disclosure.

The display 430 may be provided on one surface of the display body 410, and the protrusion 420 may be formed on the other surface of the display body 410.

The display 430 may include a display panel 431 and a display window 432 configured to cover the display panel 431. The display window 432 may form one surface of the display body 410.

The circumferential surface of the display body 410 may connect the one surface and the other surface. The scanner 440 may be provided on the circumferential surface of the display body 410. In more detail, a mounting hole 412 in which the scanner 440 is mounted may be defined on the circumferential surface of the display body 410.

The scanner 440 may include a scanner body 441 and a window 442 (see FIG. 11).

The scanner body 441 may be embedded in the display body 410. The scanner body 441 may be provided toward the window 442.

The window 442 may be mounted in the mounting hole 412 defined in the display body 410. The window 442 may be continuously connected to the circumferential surface of the display body 410 without being stepped.

The circumferential surface of the display body 410 may include a first surface 411a on which the scanner 440 is provided and a second surface 411b disposed opposite to the first surface 411a. That is, the mounting hole 412 may be defined on the first surface 411a.

The protrusion 420 of the head 400 may be positioned closer to the first surface 411a than the second surface 411b. In more detail, a distance L1 between the protrusion 420 and the first surface 411a may be less than a distance L2 between the protrusion 420 and the second surface 411b. The distances L1 and L2 may refer to distances in a direction parallel to one surface or the other surface of the display body 410.

Meanwhile, a pair of coupling holes 421 and 422 to which the tilting mechanism 450 is coupled may be defined in the protrusion 420.

The pair of coupling holes 421 and 422 may be defined at both side surfaces of the protrusion 420. In more detail, the pair of coupling holes 421 and 422 may include a first coupling hole 421 defined in one side surface (e.g., a first side surface) of the protrusion 420 and a second coupling hole 422 defined in the other side surface (e.g., a second side surface opposite to the first side surface) of the protrusion 420.

A virtual tilting axis X in which the head 400 is tilted may pass through the center of the first coupling hole 421 and the second coupling hole 422.

The first coupling body 451 (see FIG. 17) may be coupled to the first coupling hole 421, and the second coupling body 456 may be coupled to the second coupling hole 422. This will be described in detail below.

The head substrate 433 electrically connected to the display 430 and/or the scanner 440 may be disposed inside the display body 410. The head substrate 433 may be connected to the harness 349 extending into the head 400.

A through hole 456d through which the harness 349 passes may be defined in the second coupling body 456. That is, the harness 349 may extend into the head 400 by passing through the through hole 456d of the second coupling body 456 inserted into the second coupling hole 422.

The diameter D2 of the second coupling hole 422 may be greater than the diameter D1 of the first coupling hole 421. Therefore, the diameter of the second coupling body 456 may be greater than the diameter of the first coupling body 451. Therefore, the through hole 456d defined in the second coupling body 456 may be defined sufficiently large, and the work of connecting the harness 349 may be facilitated.

Figure 12A:
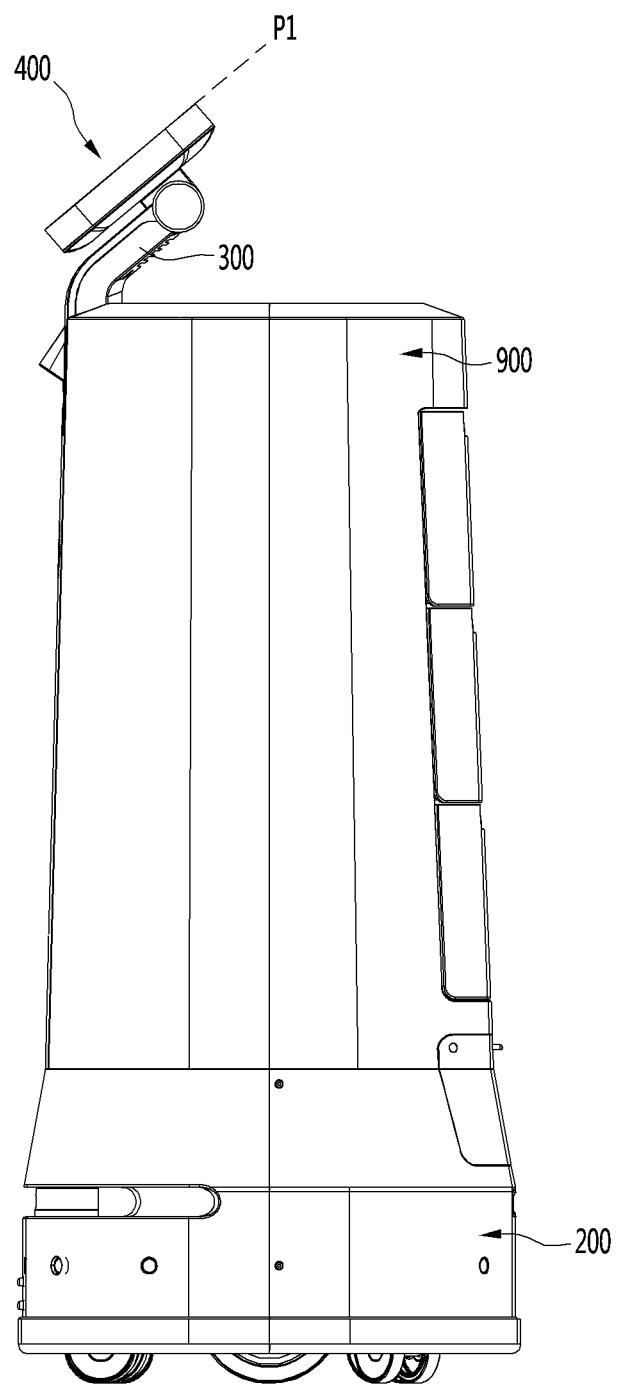
FIGS. 12A and 12B are views for describing an operation of tilting a head of a robot according to an embodiment of the present disclosure.
Figure 12B:
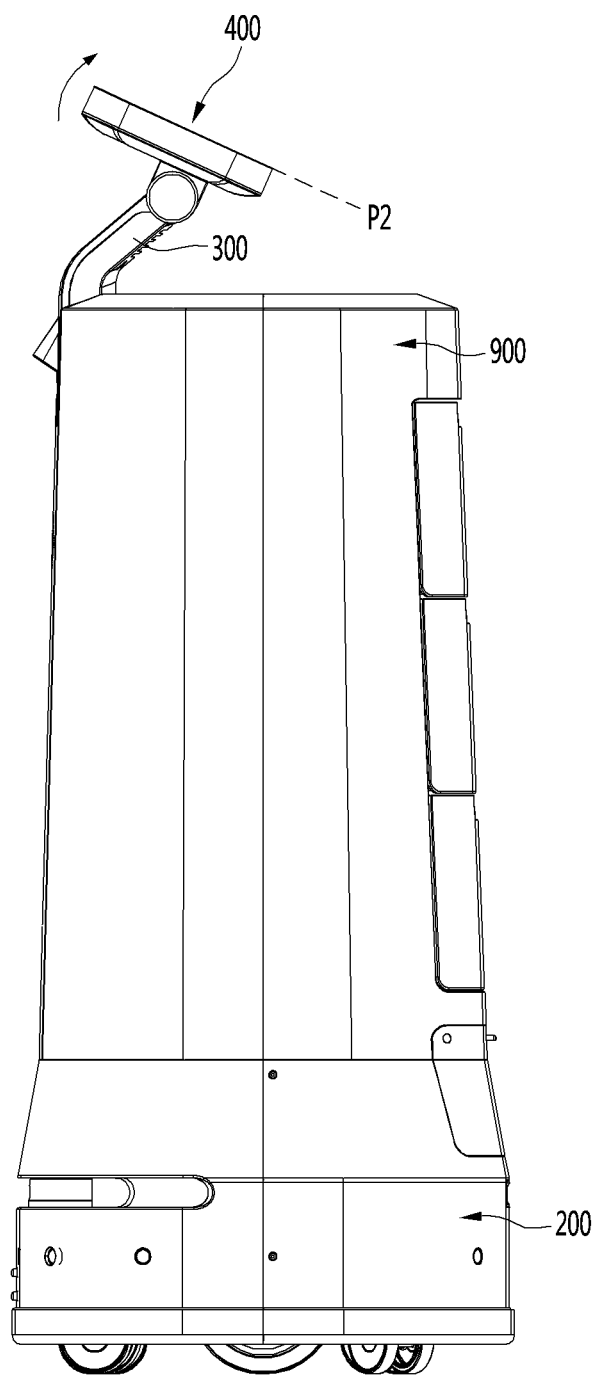
Figure 13A:
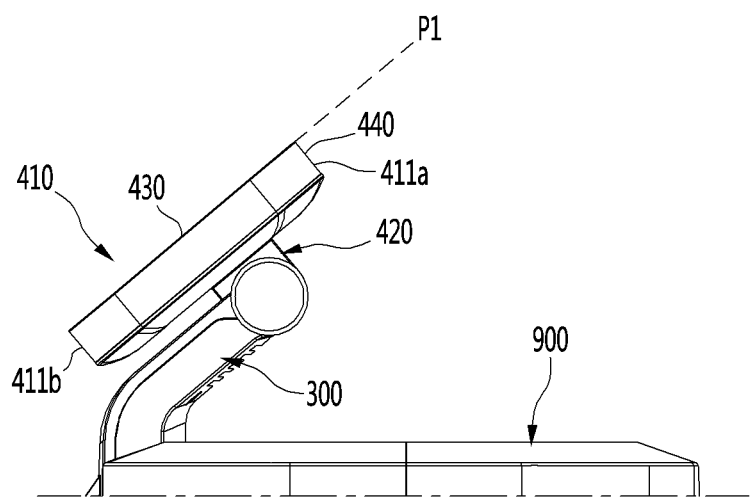
FIGS. 13A and 13B are enlarged views of the head and its surroundings illustrated in FIGS. 12A and 12B, respectively.
Figure 13B:
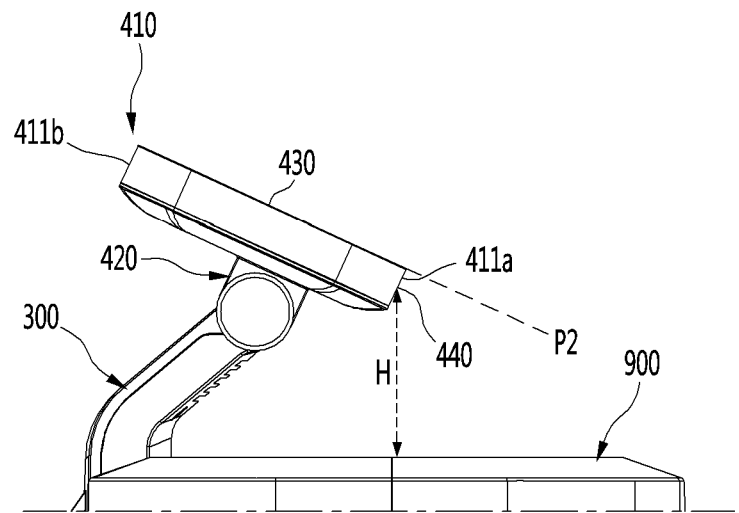

FIGS. 12A and 12B are views for describing the operation of tilting the head of the robot according to an embodiment of the present disclosure, and FIGS. 13A and 13B are enlarged views of the head and its surroundings illustrated in FIGS. 12A and 12B, respectively.

The head 400 may be tilted between a first slope P1 and a second slope P2 which are different from each other. The tilting mechanism 450 may tilt the head 400 between the first slope P1 and the second slope P2.

The first slope P1 may be vertical or may be inclined so as to decrease in height toward the front portion. The second slope P2 may be vertical or may be inclined so as to decrease in height toward the rear portion.

When the head 400 is at the first slope P1, the display 430 provided in the head 400 may face the front side or the front upper side.

When the head 400 is at the first slope P1, the scanner 440 may face an upper side or a rear upper side. That is, the first surface 411a of the display body 410 may be the top surface, and the second surface 411b of the display body 410 may be the bottom surface.

When the head 400 is at the second slope P2, the display 430 provided in the head 400 may face a rear side or a rear upper side.

When the head 400 is at the second slope P2, the scanner 440 may face a lower side or a rear lower side. That is, the first surface 411a of the display body 410 may be the bottom surface, and the second surface 411b of the display body 410 may be the top surface.

When the main body 200 is driven, the head 400 may be tilted at the first slope P1. In addition, the display 430 may display an emoticon, an image of a human facial expression, or the like, when the main body 200 is driven. Therefore, people may feel as if the robot 10a is traveling while approximately looking straight ahead.

When the main body 200 is driven, the touch input through the display 430 may be deactivated. In addition, the scanner 440 may be deactivated when the main body 200 is driven.

When the main body 200 is stopped, the head 400 may be tilted at the second slope P2. In addition, when the main body 200 is stopped, the touch input through the display 430 is activated, and a variety of information related to the operation of the preset virtual touch button or the robot 10a may be displayed on the display 430. Therefore, the user may easily perform the touch input on the display 430 while the robot 10a is stopped.

In addition, when the main body 200 is stopped, the scanner 440 may be activated. When the head 400 is at the second slope P2, the scanner 440 faces a rear lower side, so that the user can easily tag a preset code (e.g., a barcode and/or a QR code) to the scanner 440.

As described above, the protrusion 420 of the head 400 may be positioned closer to the first surface 411a, on which the scanner 440 is provided, than the second surface 411b. Therefore, when the head 400 is at the second slope P2, a vertical distance H between the upper surface of the service module 900 and the scanner 440 may be sufficiently increased.

Therefore, the tag operation of the user with respect to the scanner 440 may be smoothly performed.

Figure 14:
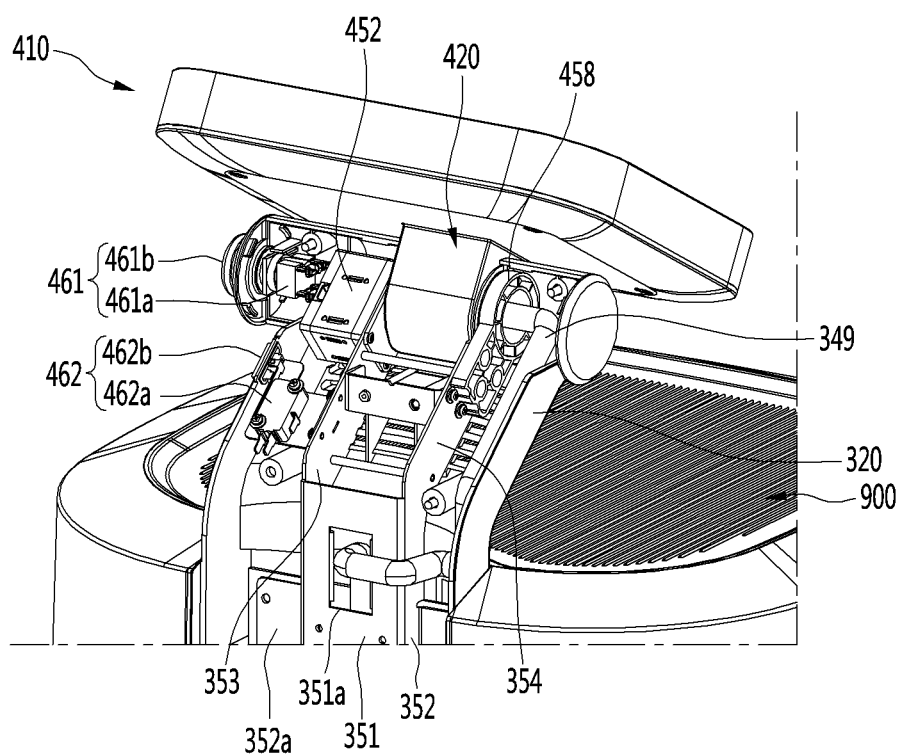
FIG. 14 is a view illustrating the connection of the tilting mechanism and a head according to an embodiment of the present disclosure.
Figure 15:
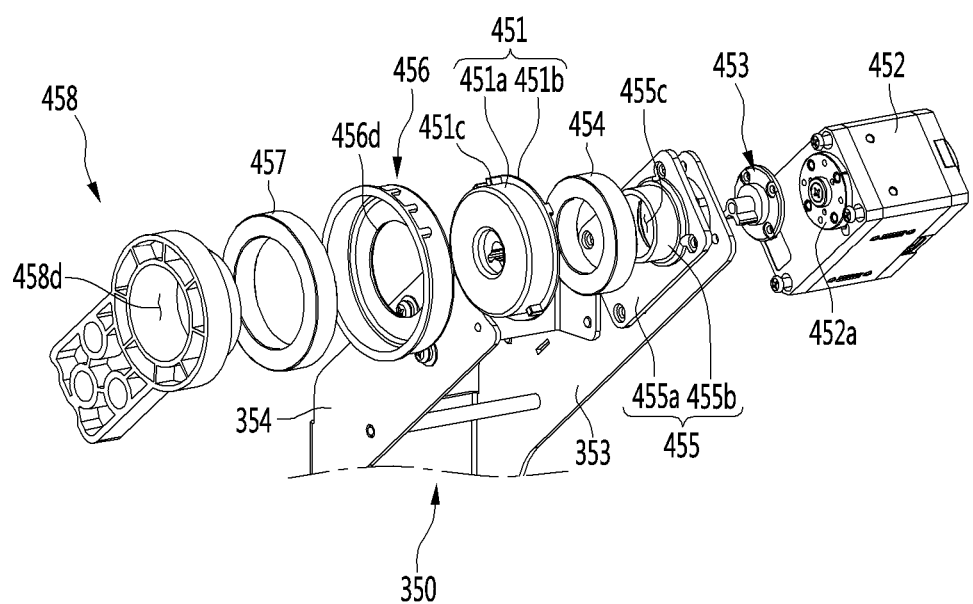
FIG. 15 is an exploded perspective view of the tilting mechanism according to an embodiment of the present disclosure.
Figure 16:
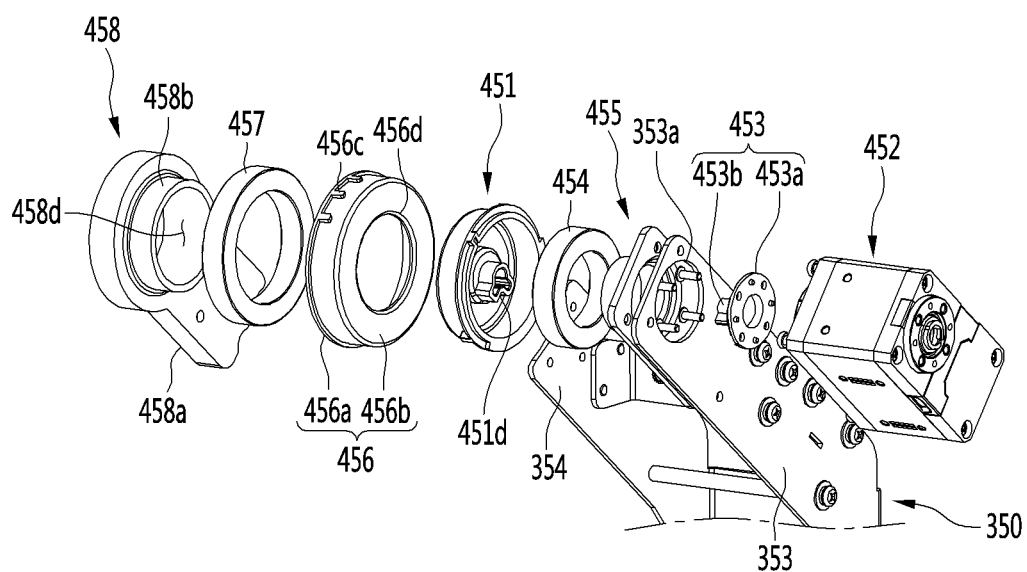
FIG. 16 is an exploded perspective view of the tilting mechanism illustrated in FIG. 15, when viewed from another direction.
Figure 17:
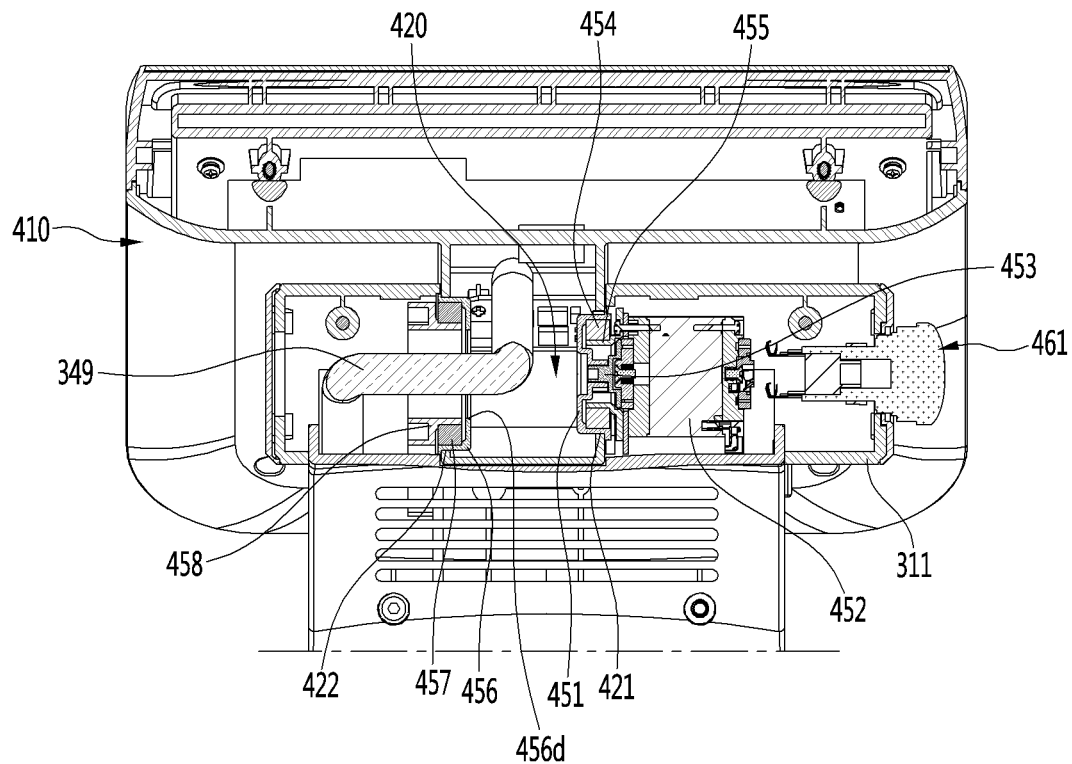
FIG. 17 is a cross-sectional view taken along line B-B' of FIG. 4.

FIG. 14 is a view illustrating the connection of the tilting mechanism and the head according to an embodiment of the present disclosure, FIG. 15 is an exploded perspective view of the tilting mechanism according to an embodiment of the present disclosure, FIG. 16 is an exploded perspective view of the tilting mechanism illustrated in FIG. 15, when viewed from another direction, and FIG. 17 is a cross-sectional view taken along line B-B' of FIG. 4.

The support frame 350 may include a panel portion 351, a pair of bent portions 352, and a pair of inclined portions 353 and 354.

The panel portion 351 may be spaced forward from the front surface of the neck plate 340. Therefore, a gap through which the harness 349 passes may be defined between the panel portion 351 and the neck plate 340.

The panel portion 351 may be provided with a through hole 351a through which the harness 349 passes. The through hole 351a may pass through the panel portion 351 back and forth.

The pair of bent portions 352 may be bent rearward at both edges of the panel portion 351. Therefore, the harness 349 passing through the gap may pass between the pair of bent portions 352.

A coupling plate 352a, which is parallel to the neck plate 340 and coupled to the neck plate 340, may be provided at the rear end of the bent portion 352. Therefore, the support frame 350 may be coupled to the neck plate 340.

The pair of inclined portions 353 and 354 may extend in a direction inclined rearward toward the upper side from the upper ends of the pair of bent portions 352. In addition, the tilting mechanism 450 may be mounted to the pair of inclined portions 353 and 354.

The pair of inclined portions 353 and 354 may include a first inclined portion 353 extending toward one side of the protrusion 420 of the head 400 and a second inclined portion extending toward the other side of the protrusion 420. The first inclined portion 353 and the second inclined portion 354 may be spaced apart side by side.

Meanwhile, the tilting mechanism 450 may include coupling bodies 451 and 456, a motor 452, and bearings 454 and 457. The tilting mechanism 450 may further include supporters 455 and 458.

The coupling bodies 451 and 456 may have a circular cap shape.

The coupling bodies 451 and 456 may be coupled opposite sides of the protrusion 420 of the head 400. That is, the coupling bodies 451, 456 may be provided with a pair. The pair of coupling bodies 451 and 456 may include a first coupling body 451 coupled to one side of the protrusion 420 and a second coupling body 456 coupled to the other side of the protrusion 420.

In more detail, the first coupling body 451 may be fitted and coupled to the first coupling hole 421 defined in the protrusion 420. The second coupling body 456 may be fitted and coupled to the second coupling hole 422 defined in the protrusion 420.

That is, the first coupling body 451 and the second coupling body 456 may be directly coupled to the protrusion 420. Therefore, the structure of the head 400 is simplified and compact, and assembly is improved. In addition, since the load of the head 400 is transmitted to the support frame 350 and the neck plate 340 through the first coupling body 451 and the second coupling body 456, the load of the head 400 applied to the motor 452 can be reduced.

The first coupling body 451 may include a first insertion portion 451a inserted into the first coupling hole 421 and a first extension portion 451b contacting one side of the protrusion 420.

The outer diameter of the first insertion portion 451a may be equal to the inner diameter of the first coupling hole 421 or slightly less than the inner diameter of the first coupling hole 421. Therefore, the first insertion portion 451a may be inserted into the first coupling hole 421 and fitted thereto.

The first extension portion 451b may extend from the outer circumferential end of the first insertion portion 451a. The outer diameter of the first extension portion 451b may be greater than the inner diameter of the first coupling hole 421. Therefore, the first extension portion 451b may be caught around the first coupling hole 421 without passing through the first coupling hole 421. Therefore, the first extension portion 451b may prevent the first coupling body 451 from completely entering the first coupling hole 421.

At least one first engaging groove 421a (see FIG. 10) may be formed on the inner circumference of the first coupling hole 421, and a first projection 451c to be caught by the first engaging groove 421a may be formed on the outer circumference of the first coupling body 451. In more detail, the first projection 451c may be formed in the outer circumference of the first insertion portion 451a. The first projection 451c may be connected to the first extension portion 451b.

When the first coupling body 451 is fitted to the first coupling hole 421, the first projection 451c may be caught by the first engaging groove 421a. Therefore, relative rotation does not occur between the first coupling body 451 and the first coupling hole 421, and the first coupling body 451 and the protrusion 420 may rotate together.

The second coupling body 456 may include a second insertion portion 456a inserted into the second coupling hole 422 and a second extension portion 456b contacting the other surface of the protrusion 420.

The outer diameter of the second insertion portion 456a may be equal to the inner diameter of the second coupling hole 422 or slightly less than the inner diameter of the second coupling hole 422. Therefore, the second insertion portion 456a may be inserted into the second coupling hole 422 and fitted thereto.

The second extension portion 456b may extend from the outer circumferential end of the second insertion portion 456a. The outer diameter of the second extension portion 456b may be greater than the inner diameter of the second coupling hole 422. Therefore, the second extension portion 456b may be caught around the second coupling hole 422 without passing through the second coupling hole 422. Therefore, the second extension portion 456b may prevent the second coupling body 456 from fully entering the second coupling hole 422.

A through hole 456d through which the harness 349 passes may be defined in the second coupling body 456. The through hole 456d may be defined in the second insertion portion 456a and may pass toward the inside of the protrusion 420 of the head 400.

At least one second engaging groove 422a (see FIG. 10) may be formed on the inner circumference of the second coupling hole 422, and a second projection 456c to be caught by the second engaging groove 422a may be formed on the outer circumference of the second coupling body 456. In more detail, the second projection 456c may be formed in the outer circumference of the second inserting portion 456a. The second projection 456c may be connected to the second extension portion 456b.

When the second coupling body 456 is fitted to the second coupling hole 422, the second projection 456c may be caught by the second engaging groove 422a. Therefore, relative rotation does not occur between the second coupling body 456 and the second coupling hole 422, and the second coupling body 456 and the protrusion 420 may rotate together.

Meanwhile, the motor 452 may rotate the first coupling body 451. The first coupling body 451 may be connected to the motor 452 by a connector 453.

In more detail, the connector 453 may include a connecting plate 453a connected to a rotation portion 452a of the motor 452 and an insertion protrusion 453b protruding from the connecting plate 453a toward the first coupling body 451.

An insertion groove 451d into which the insertion protrusion 453b is inserted may be formed in the first coupling body 451. The cross-sections of the insertion protrusion 453b and the insertion groove 451d may be non-circular. Therefore, the rotational force of the motor 452 can be smoothly transmitted to the first coupling body 451 through the connector 453. Therefore, the first coupling body 451 and the protrusion 420 may rotate together and the head 400 may be tilted.

Based on the protrusion 420 of the head 400, the motor 452 may be positioned on the same side as the first coupling body 451 and positioned on the side opposite to the second coupling body 456. That is, the motor 452 and the harness 349 may be positioned opposite to each other with respect to the protrusion 420 of the head 400. Therefore, the harness 349 may easily extend into the protrusion 420 without interfering with the motor 452, and the work of connecting the harness 349 may be smoothed (that is, the harness 349 may be easily connected to the substrate 341 and to the head substrate 433).

Bearings 454 and 457 may assist the rotation of the coupling bodies 451 and 456. The bearings 454 and 457 may has an approximately circular ring shape.

The bearings 454 and 457 may be provided with a pair, and the pair of bearings 454 and 457 may include a first bearing 454 covered by the first coupling body 451 and a second bearing 457 covered by the second coupling body 456.

That is, the first coupling body 451 and the second coupling body 456 may be referred to as a first bearing cap and a second bearing cap, respectively.

The diameter of the second bearing 457 may be greater than the diameter of the first bearing 454.

The first bearing 454 and the second bearing 457 may each include an inner ring, an outer ring, and a rolling member provided between the inner ring and the outer ring. For example, the rolling member may be a ball or a roller.

The inner ring of the first bearing 454 may be fixed while surrounding the outer circumference of a mounting portion 455b of the first supporter 455, also referred to as a first mounting portion 455b. The outer ring of the first bearing 454 may rotate together with the first coupling body 451 while contacting the inner circumference of the first coupling body 451.

The inner ring of the second bearing 457 may be fixed while surrounding the outer circumference of the mounting portion 458c of the second supporter 458. The outer ring of the second bearing 457 may rotate together with the second coupling body 456 while contacting the inner circumference of the second coupling body 456.

The supporters 455 and 458 may support the coupling bodies 451 and 456. The bearings 454 and 457 may be provided between the supporters 455 and 458 and the coupling bodies 451 and 456.

In more detail, the bearings 454 and 457 may be mounted to the supporters 455 and 458. Therefore, the supporters 455 and 458 may be referred to as bearing mounters.

The supporters 455 and 458 may be provided with a pair. The pair of supporters 455 and 458 may include a first supporter 455 configured to support the first coupling body 451 and a second supporter 458 configured to support the second coupling body 456.

The first bearing 454 may be mounted to the first supporter 455, and the second bearing 457 may be mounted to the second supporter 458.

In addition, the supporters 455 and 458 may be coupled to the support frame 350. In more detail, the first supporter 455 may be coupled to the first inclined portion 353 of the support frame 350, and the second supporter 458 may be coupled to the second inclined portion 354 of the support frame 350. Therefore, the load of the head 400 coupled to the coupling bodies 451 and 456 may be transmitted to the support frame 350 through the supporters 455 and 458.

The first supporter 455 may be coupled to one surface of the first inclined portion 353 facing the protrusion 420 of the head 400. In addition, the motor 452 may be coupled to the other surface of the first inclined portion 353. That is, the motor 452 and the first supporter 455 may be positioned on the side opposite to the first inclined portion 353.

The first supporter 455 may include a first coupling portion 455a coupled to the first inclined portion 353, and a first mounting portion 455b which is formed on the first coupling portion 455a and to which the first bearing 454 is mounted.

The first coupling portion 455a may have a plate shape parallel to one surface of the first inclined portion 353. The first mounting portion 455b may have a hollow cylindrical shape protruding from the first coupling portion 455a toward the protrusion 420 of the head 400. The first bearing 454 may surround the outer circumference of the first mounting portion 455b and may be mounted to the first mounting portion 455b.

An opening hole 455c through which the connector 453 passes may be defined in the first supporter 455. The opening hole 455c may be defined to pass from the first coupling portion 455a to the first mounting portion 455b.

In addition, a hole 353a communicating with the opening hole 455c may be defined in the first inclined portion 353.

Therefore, the connector 453 may connect the motor 452 to the first coupling body 451 through the hole 353a defined in the first inclined portion 353 and the opening hole 455c defined in the first supporter 455.

The second supporter 458 may include a second coupling portion 458a coupled to the second inclined portion 354, and a second mounting portion 458b which is formed on the second coupling portion 458a and on which the second bearing 457 is mounted.

The second coupling portion 458a may be parallel to one surface of the second inclined portion 354. The second mounting portion 458b may have a hollow cylindrical shape protruding from the second coupling portion 458a toward the protrusion 420 of the head 400. The second bearing 457 may surround the outer circumference of the second mounting portion 458b and may be mounted to the second mounting portion 458b.

A through hole 458d through which the harness 349 passes may be defined in the second supporter 458. The through hole 458d may be defined to pass from the second coupling portion 458a to the second mounting portion 458b.

Therefore, the harness 349 may sequentially pass through the through hole 458d defined in the second supporter 458 and the through hole 456d defined in the second coupling body 456 to extend into the head 400.

The emergency stop switch 461 may be disposed at one side of the motor 452. The motor 452 may be positioned between the protrusion 420 of the head 400 and the emergency stop switch 461.

The neck housing 310 may be provided with a side protrusion 311 protruding laterally to be stepped from the side surface of the neck housing 310 and having an emergency stop switch 461 disposed thereon. The side protrusion 311 may be formed at the upper end of the neck housing 310.

The emergency stop switch 461 may include a switch body 461a and an emergency stop button 461b. The switch body 461a may be positioned inside the side protrusion 311, and the emergency stop button 461b may protrude to the side of the side protrusion 311.

The release switch 462 may be positioned below the motor 452. The release switch 462 may be coupled to the support frame 350, and more particularly, the first inclined portion 353.

The release switch 462 may be positioned between the inner surface of the neck housing 410 and the first inclined portion 353. That is, the motor 452, the emergency stop switch 461, and the release switch 462 may be positioned on the same side based on the first inclined portion 353.

The release switch 462 may include a switch body 462a and a release button 462b. The switch body 462a may be positioned inside the neck housing 410, and the release button 462b may protrude to the side of the neck housing 410.

Figure 18:
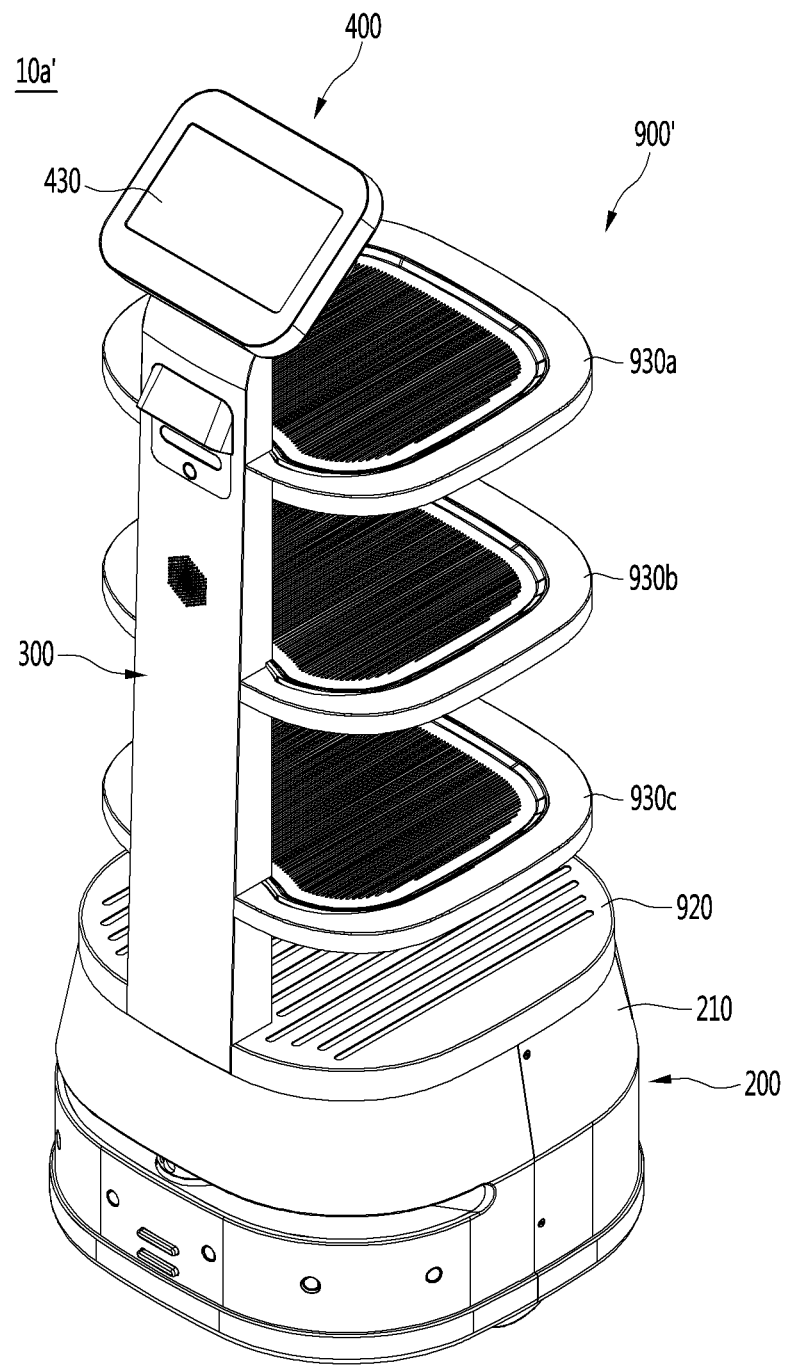
FIG. 18 is a perspective view of a robot according to another embodiment of the present disclosure.
Figure 19:
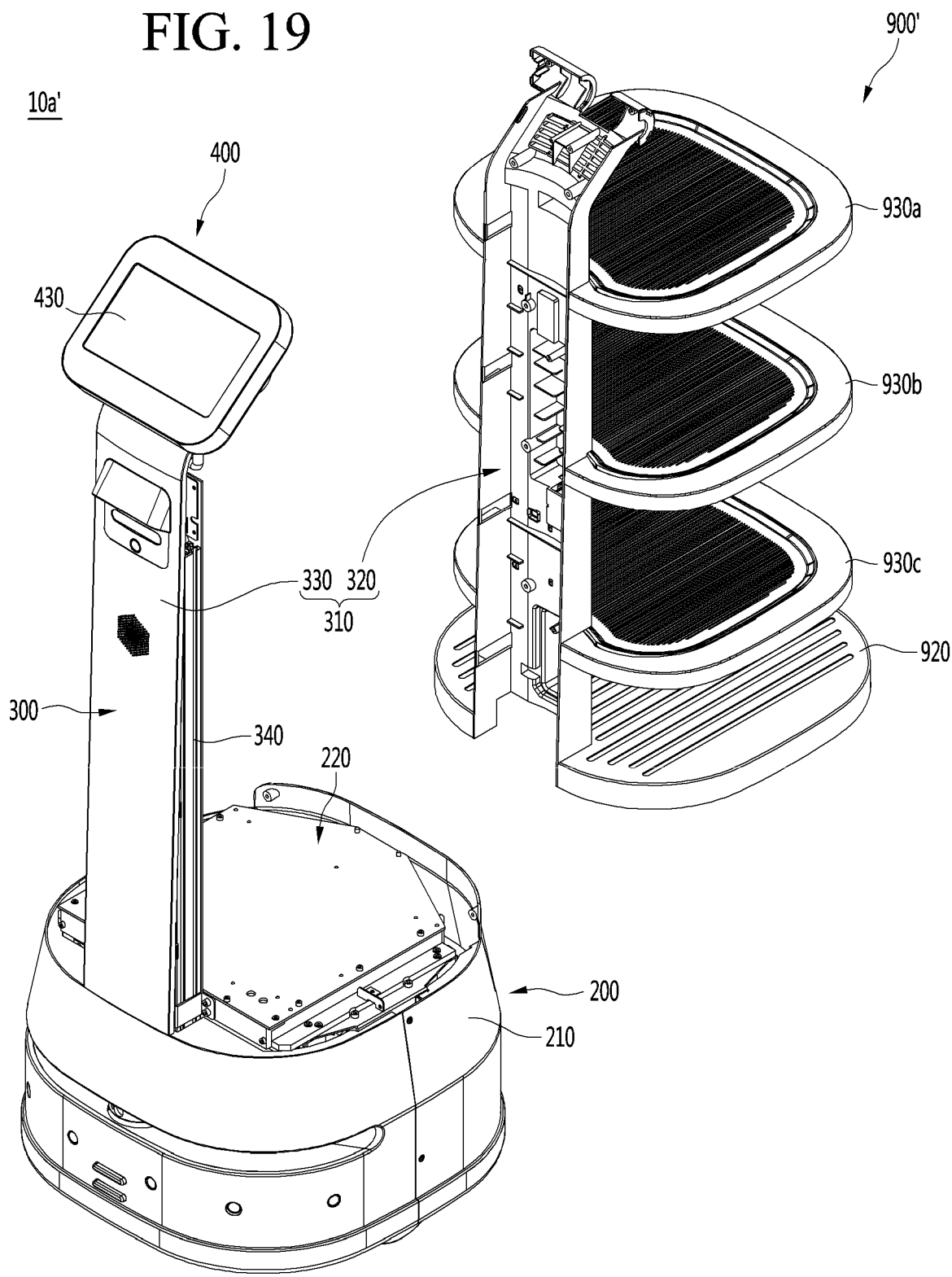
FIG. 19 is a diagram illustrating a service module separated from the robot illustrated in FIG. 18.

FIG. 18 is a perspective view of a robot according to another embodiment of the present disclosure, and FIG. 19 is a diagram illustrating a service module separated from the robot illustrated in FIG. 18.

Since a robot 10a' according to the present embodiment is the same as the robot 10a of the above-described embodiment, except for a service module 900', a redundant description thereof will be omitted and a differences will be mainly described.

The service module 900' according to the present embodiment may include a base 930 and a plurality of shelves 930a, 930b, and 930c.

The base 920 may be disposed horizontally. The base 920 may cover an opened upper surface of a housing 210 of a main body 200 from above. The base 920 may cover a body frame 220 from above (i.e., the base 920 may overlap the body frame 220 in a vertical direction).

The lower end of the rear case 320 of the neck housing 310 may be connected to the front edge of the base 920.

The plurality of shelves 930a, 930b, and 930c may be coupled at the rear portion of the rear case 320. The plurality of shelves 930a, 930b, and 930c may be positioned at different heights. The plurality of shelves 930a, 930b, and 930c may be spaced apart from each other vertically.

The shelf 930c positioned at the lowest height among the plurality of shelves 930a, 930b, and 930c may be spaced apart from the upper side of the base 920.

The robot 10a may autonomously travel in a state in which articles are placed on the base 920 and the plurality of shelves 930a, 930b, and 930c.

According to a preferred embodiment of the present disclosure, since the load of the head is transmitted through the coupling body to the neck body, the load of the head can be effectively supported and the load applied to the motor can be reduced.

In addition, since the coupling body is coupled directly to the protrusion of the head, the assembly of the head can be further improved.

The protrusion of the head can also be inserted into the neck body and connected to the tilting mechanism. Therefore, the robot becomes compact and the assembly of the head is improved.

In addition, since the coupling body performs the function of the bearing cap, the number of parts can be reduced. Therefore, the manufacturing costs are reduced and the configuration is simplified.

In addition, the coupling body may include the insertion portion and the extension portion that extends at the outer circumferential end of the insertion portion and is caught around the coupling hole. Therefore, the coupling body can be prevented from separating into the protrusion of the head through the coupling hole.

In addition, the engaging groove may be formed in the inner circumference of the coupling hole, and the projection that is caught by the engaging groove may be formed on the outer circumference of the coupling body. Therefore, the relative rotation of the coupling body and the coupling hole does not occur, and the coupling body and the protrusion may rotate together.

In addition, the harness extending into the head may pass through the opposite side of the motor with respect to the protrusion of the head. Therefore, the connection work of the harness is facilitated and the motor and the harness are not interfered.

In addition, the through hole through which the harness passes may be formed in the second supporter and the second coupling body. Therefore, the harness can easily extend into the head.

In addition, the diameter of the second coupling hole may be greater than the diameter of the first coupling hole. Therefore, the size of the second coupling body fitted to the second coupling hole can be increased, and the through hole can be formed sufficiently large in the second coupling body. Therefore, the work of connecting the harness may be easier.

In addition, the neck housing may also include the rear case and the front cover, and the neck plate disposed inside the neck housing may face the front cover. Therefore, when the front cover is removed, the neck plate is easily accessible. This facilitates the maintenance of the electrical components mounted to the neck plate.

In addition, the head can be tilted between the first slope at which the display faces the front side or the front upper side and the second slope at which the display faces the rear side or the rear upper side. This allows the user to feel as if the robot is looking forward or backward. Based on this, the tilting control according to various operation scenarios is possible.

In addition, the head may be tilted at the first slope when the main body travels, and the head may be tilted at the second slope when the main body is stopped. This allows the user to intuitively determine the state of the robot simply by tilting the head.

In addition, the scanner may be provided on the circumferential surface of the display body and the protrusion may be eccentrically formed in the scanner. Therefore, when the head is tilted about the protrusion and the scanner faces the rear lower side, the position of the scanner can be kept relatively high. Therefore, the user's tag operation with respect to the scanner may be smooth.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to describe the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

What is claimed is:

1. A robot, comprising:
   a main body including a driving wheel;
   a neck body extending upward from a front portion of the main body;
   a head including:
     a display body including a display; and
     a protrusion protruding from the display body and extending in the neck body;
   a tilting mechanism configured to tilt the head; and
   a support frame disposed inside the neck body and configured to support the tilting mechanism,
   wherein the tilting mechanism comprises:
     a coupling body coupled to the protrusion;
     a supporter coupled to the support frame and configured to support the coupling body; and
     a motor configured to rotate the coupling body,
   wherein the neck body comprises:
     a neck housing including:
       a rear case having an opened front side; and
       a front cover covering the opened front side of the rear case; and
     a neck plate disposed inside the neck housing, the neck plate extending vertically and facing the front cover, and
   wherein the support frame is coupled to the neck plate.

2. The robot according to claim 1, wherein the tilting mechanism further comprises a bearing provided between the coupling body and the supporter.

3. The robot according to claim 1, wherein the protrusion includes a first side and a second side opposite to the first side,
wherein the first side of the protrusion includes a first coupling hole,
wherein the second side of the protrusion includes a second coupling hole,
wherein the coupling body includes a first coupling body and a second coupling body,
wherein the first coupling body is coupled to the first coupling hole, and
wherein the second coupling body is coupled to the second coupling hole.

4. The robot according to claim 3, wherein the first coupling body comprises:
a first insertion portion inserted into the first coupling hole; and
a first extension portion extending from an outer circumferential end of the first insertion portion and contacting a side surface of the protrusion.

5. The robot according to claim 3, wherein an inner circumference of the first coupling hole includes a first engaging groove,
wherein an outer circumference of the first coupling body includes a first projection, and
wherein the first projection of the first coupling body engages the first engaging groove of the first coupling hole.

6. A robot, comprising:
a main body including a driving wheel;
a neck body extending upward from a front portion of the main body;
a head including:
a display body including a display; and
a protrusion protruding from the display body and extending in the neck body;
a tilting mechanism configured to tilt the head; and
a support frame disposed inside the neck body and configured to support the tilting mechanism,
wherein the tilting mechanism comprises:
a first coupling body coupled to a first side of the protrusion and a second coupling body coupled to a second side of the protrusion, the first side of the protrusion being opposite to the second side of the protrusion;
a motor configured to rotate the first coupling body;
a first supporter coupled to the support frame and configured to support the first coupling body; and
a second supporter coupled to the support frame and configured to support the second coupling body,
wherein the neck body comprises:
a neck housing including:
a rear case having an opened front side; and
a front cover covering the opened front side of the rear case; and
a neck plate disposed inside the neck housing, the neck plate extending vertically and facing the front cover, and
wherein the support frame is coupled to the neck plate.

7. The robot according to claim 6, wherein the tilting mechanism further comprises:
a first bearing provided between the first coupling body and the first supporter; and
a second bearing provided between the second coupling body and the second supporter.

8. The robot according to claim 7, wherein the first bearing is mounted to the first supporter, and
wherein the second bearing is mounted to the second supporter.

9. The robot according to claim 6, further comprising a connector connecting the motor to the first coupling body,
wherein the first supporter includes a first opening hole, and
wherein the connector passes through the first opening hole of the first supporter.

10. The robot according to claim 9, wherein the connector includes an insertion protrusion,
wherein the first coupling body includes an insertion groove, and
wherein the insertion protrusion of the connector engages the insertion groove of the first coupling body to connect the motor to the first coupling body.

11. The robot according to claim 6, further comprising:
a main control board; and
a harness,
wherein the neck body further includes a substrate,
wherein the head further includes a head substrate,
wherein the harness connects the substrate of the neck body to the head substrate of the head, and
wherein the harness passes through the second supporter and the second coupling body.

12. The robot according to claim 6, further comprising:
a connector connecting the motor to the first coupling body; and
a harness,
wherein the first supporter includes a first opening hole,
wherein the connector passes through the first opening hole of the first supporter,
wherein the second supporter is provided with a first through hole and the second coupling body is provided with a second through hole,
wherein the harness passes through the first through hole and the second through hole and extends into the head, and
wherein a diameter of the first through hole and a diameter of the second through hole are each greater than a diameter of the first opening hole.

13. The robot according to claim 6, wherein the protrusion includes a first side and a second side opposite to the first side,
wherein the first side of the protrusion includes a first coupling hole,
wherein the second side of the protrusion includes a second coupling hole, and
wherein a diameter of the second coupling hole is greater than a diameter of the first coupling hole.

14. The robot according to claim 6, wherein the tilting mechanism is configured to tilt the head between a first slope at which the display faces a front side of the robot and a second slope at which the display faces a rear side of the robot.

15. The robot according to claim 14, wherein the tilting mechanism is configured to tilt the head at the first slope when the main body travels, and tilt the head at the second slope when the main body is stopped.

16. The robot according to claim 6, wherein the support frame comprises:
a panel portion spaced forward from the neck plate;
a pair of bent portions bent toward the neck plate at opposite edges of the panel portion;

a first inclined portion extending in a rearwardly inclined direction toward an upper side from an upper end of the panel portion or the bent portion, the first supporter being coupled to the first inclined portion; and a second inclined portion horizontally spaced from the first inclined portion, the second supporter being coupled to the second inclined portion.

17. The robot according to claim 16, further comprising a substrate mounted on a front surface of the neck plate, wherein the substrate is connected to the head through a harness, and wherein the harness passes between the neck plate and the panel portion.

18. A robot, comprising:

a main body including a driving wheel;

a neck body extending upward from a front portion of the main body;

a head including:
   a display body including:
      a first surface, a second surface opposite to the first surface, and a circumferential surface;
      a display provided on the first surface of the display body;
      a scanner provided on the circumferential surface of the display body and configured to scan a code; and
      a protrusion protruding from the second surface of the display body and provided in the neck body; and a tilting mechanism disposed inside the neck body and connected to the protrusion to tilt the head, wherein the circumferential surface of the display body includes a first surface on which the scanner is provided and a second surface opposite to the first surface, and wherein a distance between the protrusion and the first surface is closer than a distance between the protrusion and the second surface.

19. The robot according to claim 18, wherein the tilting mechanism is configured to tilt the head between a first slope at which the display faces a direction inclined toward a front upper side and a second slope at which the display faces a direction inclined toward a rear upper side, wherein, when the head is at the first slope, the scanner faces the rear upper side, and wherein, when the head is at the second slope, the scanner faces a rear lower side.

\* \* \* \* \*